United States Patent
Ma et al.

(10) Patent No.: US 12,413,257 B2
(45) Date of Patent: Sep. 9, 2025

(54) DOWNLINK TRANSMITTING SYSTEM AND SWITCHING METHOD

(71) Applicant: HUAWEI TECHNOLOGIES CO., LTD., Guangdong (CN)

(72) Inventors: Ni Ma, Shanghai (CN); Guanxi Zhang, Shanghai (CN); Long Shen, Shanghai (CN); Xi Chen, Madrid (ES); Xin Yu, Shenzhen (CN); Yaqi Wu, Shenzhen (CN); Wei Gu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 444 days.

(21) Appl. No.: 18/157,976

(22) Filed: Jan. 23, 2023

(65) Prior Publication Data

US 2023/0155616 A1     May 18, 2023

Related U.S. Application Data

(63) Continuation of application No. PCT/CN2021/104770, filed on Jul. 6, 2021.

(30) Foreign Application Priority Data

Jul. 23, 2020   (CN) .......................... 202010716226.7

(51) Int. Cl.
  *H04B 1/04*      (2006.01)
  *H04B 7/04*      (2017.01)
  (Continued)

(52) U.S. Cl.
  CPC ......... *H04B 1/0483* (2013.01); *H04B 1/0458* (2013.01)

(58) Field of Classification Search
  None
  See application file for complete search history.

(56) References Cited

U.S. PATENT DOCUMENTS 7,526,321 B2 *  4/2009  Liu .................... H04B 7/086
                                                455/562.1
9,184,829 B2 * 11/2015  Miller ............... H04B 7/18543
(Continued)

FOREIGN PATENT DOCUMENTS

CN       101021561 A      8/2007
CN       102131211 A      7/2011
(Continued)

OTHER PUBLICATIONS

CMCC, "Hybrid Beamforming for Massive MIMO," 3GPP TSG RAN WG1 #85, R1-164893, Nanjing, China, May 23-27, 2016, 5 pages.

(Continued)

*Primary Examiner* — Pablo N Tran
(74) *Attorney, Agent, or Firm* — Fish & Richardson P.C.

(57) ABSTRACT

This application provides a downlink transmitting system and a switching method. An example downlink transmitting system includes at least one digital intermediate frequency module group, at least one Tx port group, a plurality of power amplifiers (PAs), at least one switching switch, and an antenna array. The plurality of PAs are connected to the antenna array. The plurality of PAs are connected to all Tx ports included in the downlink transmitting system in a one-to-one correspondence. The at least one digital intermediate frequency module group is in a one-to-one correspondence with the at least one Tx port group. Each of the at least one Tx port group is connected to each digital intermediate frequency module in a corresponding digital intermediate frequency module group through one of the at least one switching switch. The each of the at least one Tx port group includes a plurality of Tx ports.

20 Claims, 28 Drawing Sheets

(51) Int. Cl.
H04B 7/06 (2006.01)
H04W 52/02 (2009.01)

(56) References Cited

U.S. PATENT DOCUMENTS

| | | | |
|---|---|---|---|
| 10,608,678 B1 * | 3/2020 | Hormis | H04B 1/0458 |
| 11,184,066 B2 * | 11/2021 | Clifton | H04W 16/28 |
| 11,411,641 B2 * | 8/2022 | Hormis | H04B 7/086 |
| 11,848,898 B2 * | 12/2023 | Hormis | H04W 72/23 |
| 2017/0062948 A1 * | 3/2017 | Artemenko | H04B 7/0617 |
| 2019/0260442 A1 | 8/2019 | Clifton | |
| 2020/0028556 A1 * | 1/2020 | Inoue | H04B 7/088 |

FOREIGN PATENT DOCUMENTS

| | | |
|---|---|---|
| CN | 102917460 A | 2/2013 |
| CN | 106506036 A | 3/2017 |
| CN | 108092698 A | 5/2018 |
| CN | 110011721 A | 7/2019 |
| CN | 110915174 A | 3/2020 |
| CN | 110999419 A | 4/2020 |
| WO | 2018098634 A1 | 6/2018 |
| WO | 2019200570 A1 | 10/2019 |

OTHER PUBLICATIONS

Office Action in Chinese Appln. No. 202010716226.7, dated Jun. 8, 2022, 13 pages (with English translation).
International Search Report and Written Opinion in International Appln. No. PCT/CN2021/104770, mailed on Sep. 28, 2021, 15 pages (with English translation).

* cited by examiner

DOWNLINK TRANSMITTING SYSTEM AND SWITCHING METHOD

CROSS-REFERENCE TO RELATED APPLICATIONS

This application is a continuation of International Application No. PCT/CN2021/104770, filed on Jul. 6, 2021, which claims priority to Chinese Patent Application No. 202010716226.7, filed on Jul. 23, 2020. The disclosures of the aforementioned applications are herein incorporated by reference in their entireties.

TECHNICAL FIELD

This application relates to the communication field, and more specifically, to a downlink transmitting system and a switching method.

BACKGROUND

A massive multiple-input multiple-output (Massive MIMO) technology is a key technology of a current 5th generation (5G) mobile communication system. In this technology, a large-scale antenna array is deployed on a network device to improve a system throughput. However, because a massive MIMO device uses a large quantity of transceiver units (TRxs) (for example, 32 TRxs or 64 TRxs are used), energy consumption of the network device increases sharply. Particularly, when load of the network device is low, enabling of a large quantity of transmit (Tx) channels makes an energy efficiency ratio of the network device significantly lower than an energy efficiency ratio of the network device with medium and high load.

Currently, in an architecture of a downlink transmitting system using digital beamforming (DBF), when the load of the network device is low, a part of Tx channels are disabled to save energy. However, in this manner, in a process of disabling the part of Tx channels, the Tx channels are also disconnected from a part of the antenna array. In this case, a scale of the antenna array is reduced. Furthermore, reduction in the scale of the antenna array causes damage to an aperture of the antenna array and reduction in an effective isotropic radiated power (EIRP) of the network device. Consequently, performance and coverage of the network device are reduced to different extent.

In an architecture of a downlink transmitting system using hybrid beamforming (HBF), a quantity of Tx channels is reduced to save energy. However, when the load of the network device is high or a vertical distribution spacing between users relative to a ground is large, performance of the architecture of the downlink transmitting system using HBF is significantly poorer than performance of the architecture of the downlink transmitting system using DBF.

SUMMARY

This application provides a downlink transmitting system, which can support switching between different connection states, so as to adapt to different application scenarios.

According to a first aspect, a downlink transmitting system is provided and includes at least one digital intermediate frequency module group, at least one Tx port group, a plurality of power amplifiers (PAs), at least one switching switch, and an antenna array. The plurality of PAs are connected to the antenna array. The plurality of PAs are connected to all Tx ports included in the downlink transmitting system in a one-to-one correspondence. The at least one digital intermediate frequency module group is in a one-to-one correspondence with the at least one Tx port group. Each Tx port group is connected to each digital intermediate frequency module in a corresponding digital intermediate frequency module group through one switching switch. Each Tx port group includes a plurality of Tx ports. A quantity of digital intermediate frequency modules included in each digital intermediate frequency module group is equal to a quantity of Tx ports included in a corresponding Tx port group. Each switching switch includes at least two connection states. Quantities of enabled digital intermediate frequency modules in a digital intermediate frequency module group connected to the switching switch in different connection states are different. All Tx ports in a Tx port group connected to the switching switch in the different connection states are in an enabled state.

Based on the foregoing downlink transmitting system, each switching switch includes the at least two connection states, and the quantities of enabled digital intermediate frequency modules in the digital intermediate frequency module group connected to the switching switch in the different connection states are different. Therefore, when a quantity of enabled digital intermediate frequency modules is small, the foregoing transmitting system can achieve an effect of energy saving, and is applicable to a scenario in which network load is low. When all digital intermediate frequency modules are enabled or the quantity of enabled digital intermediate frequency modules is large, the foregoing transmitting system is applicable to a scenario in which the network load is high. In addition, regardless of the quantity of enabled digital intermediate frequency modules in the downlink transmitting system, all the Tx ports in the downlink transmitting system are in an enabled state. Therefore, PAs connected to all the Tx ports are also in an enabled state. In this way, a scale of the antenna array connected to all PAs is not reduced, and performance of the downlink transmitting system is not affected.

With reference to the first aspect, in some implementations of the first aspect, the at least two connection states include a first connection state and a second connection state, and a quantity of enabled digital intermediate frequency modules in the first connection state is greater than a quantity of enabled digital intermediate frequency modules in the second connection state. When a connection state of a first switching switch is the first connection state, a plurality of Tx ports in a first Tx port group are connected to a plurality of digital intermediate frequency modules in a first digital intermediate frequency module group in a one-to-one correspondence, the first Tx port group and the first digital intermediate frequency module group are connected through the first switching switch, and the first switching switch is any one of the at least one switching switch. When the connection state of the first switching switch is the second connection state, at least one first digital intermediate frequency module port in the first digital intermediate frequency module group is connected to at least two Tx ports in the first Tx port group, and at least one second digital intermediate frequency module in the first digital intermediate frequency module group is not connected to all Tx ports in the first Tx port group.

With reference to the first aspect, in some implementations of the first aspect, a connection state of at least one of the at least one switching switch is the first connection state when a first condition is met, and the first condition includes at least one of the following conditions: A quantity of users served by the downlink transmitting system is greater than or equal to a first threshold; and a vertical spacing between at least two of the users relative to a ground is greater than or equal to a second threshold.

With reference to the first aspect, in some implementations of the first aspect, a connection state of at least one of the at least one switching switch is the second connection state when a second condition is met, and the second condition is as follows: A quantity of users served by the downlink transmitting system is less than a first threshold, and a vertical spacing between any two of the users relative to a ground is less than a second threshold.

With reference to the first aspect, in some implementations of the first aspect, the downlink transmitting system further includes a baseband processor, and the baseband processor is configured to control a connection state of each of the at least one switching switch.

With reference to the first aspect, in some implementations of the first aspect, the switching switch is a bridge.

With reference to the first aspect, in some implementations of the first aspect, the downlink transmitting system further includes a plurality of phase shifters, and the plurality of phase shifters are connected to all the Tx ports included in the downlink transmitting system in a one-to-one correspondence.

Based on the foregoing downlink transmitting system, the phase shifter may perform analog weighting between different antenna bays included in the antenna array. Therefore, coverage of a vertical beam of the downlink transmitting system can be expanded.

According to a second aspect, a downlink transmitting system is provided and includes: at least one Tx channel group, at least one PA group, at least one switching switch, and an antenna array. The at least one PA group is connected to the antenna array. The at least one Tx channel group is in a one-to-one correspondence with the at least one PA group. Each Tx channel group is connected to each PA in a corresponding PA group through one switching switch. Each Tx channel group includes a plurality of Tx channels. Each Tx channel includes a Tx port and a digital intermediate frequency module. A quantity of PAs included in each PA group is equal to a quantity of Tx channels included in a corresponding Tx channel group. Each switching switch includes at least two connection states. Quantities of enabled Tx channels in a Tx channel group connected to the switching switch in different connection states are different. All PAs in a PA group connected to the switching switch in the different connection states are in an enabled state.

Based on the foregoing downlink transmitting system, each switching switch includes the at least two connection states, and the quantities of enabled Tx channels in the Tx channel group connected to the switching switch in the different connection states are different. Therefore, when a quantity of enabled Tx channels is small, the foregoing transmitting system can achieve an effect of energy saving, and is applicable to a scenario in which network load is low. When all Tx channels are enabled or the quantity of enabled Tx channels is large, the foregoing transmitting system is applicable to a scenario in which the network load is high. In addition, regardless of the quantity of enabled Tx channels in the downlink transmitting system, all PAs in the downlink transmitting system are in an enabled state. Therefore, a scale of the antenna array connected to all the PAs is not reduced, and performance of the downlink transmitting system is not affected.

With reference to the second aspect, in some implementations of the second aspect, the at least two connection states include a first connection state and a second connection state, and a quantity of enabled Tx channels in the first connection state is greater than a quantity of enabled Tx channels in the second connection state. When a connection state of a first switching switch is the first connection state, a plurality of Tx channels in a first Tx channel group are connected to a plurality of PAs in a first PA group in a one-to-one correspondence, the first Tx channel group and the first PA group are connected through the first switching switch, and the first switching switch is any one of the at least one switching switch. When the connection state of the first switching switch is the second connection state, at least one first Tx channel in the first Tx channel group is connected to at least two PAs in the first PA group, and at least one second Tx channel in the first Tx channel group is not connected to all PAs in the first PA group.

With reference to the second aspect, in some implementations of the second aspect, a connection state of at least one of the at least one switching switch is the first connection state when a first condition is met, and the first condition includes at least one of the following conditions: A quantity of users served by the downlink transmitting system is greater than or equal to a first threshold; and a vertical spacing between at least two of the users relative to a ground is greater than or equal to a second threshold.

With reference to the second aspect, in some implementations of the second aspect, a connection state of at least one of the at least one switching switch is the second connection state when a second condition is met, and the second condition is as follows: A quantity of users served by the downlink transmitting system is less than a first threshold, and a vertical spacing between any two of the users relative to a ground is less than a second threshold.

With reference to the second aspect, in some implementations of the second aspect, the downlink transmitting system further includes a baseband processor, and the baseband processor is configured to control a connection state of each of the at least one switching switch.

With reference to the second aspect, in some implementations of the second aspect, the switching switch is a bridge.

With reference to the second aspect, in some implementations of the second aspect, the downlink transmitting system further includes a plurality of phase shifters, and the plurality of phase shifters are connected to all the PAs included in the downlink transmitting system in a one-to-one correspondence.

Based on the foregoing downlink transmitting system, the phase shifter may perform analog weighting between different antenna bays included in the antenna array. Therefore, coverage of a vertical beam of the downlink transmitting system can be expanded.

According to a third aspect, a downlink transmitting system is provided and includes: a plurality of Tx channels, at least one PA group, at least one switching switch, and an antenna array. The plurality of Tx channels are connected to all PAs included in the downlink transmitting system in a one-to-one correspondence. The antenna array includes at least one antenna bay group. The at least one PA group is in a one-to-one correspondence with the at least one antenna bay group. Each PA group is connected to each antenna bay in a corresponding antenna bay group through one switching switch. Each PA group includes a plurality of PAs. A quantity of PAs included in each PA group is equal to a quantity of antenna bays included in a corresponding antenna bay group. Each switching switch includes at least two connection states. Quantities of enabled PAs in a PA group connected to the switching switch in different connection states are different. All antenna bays in an antenna bay group connected to the switching switch in the different connection states are in an enabled state.

Based on the foregoing downlink transmitting system, each switching switch includes the at least two connection states, and the quantities of enabled PAs in the PA group connected to the switching switch in the different connection states are different. In other words, quantities of enabled Tx channels connected to the PAs in a one-to-one correspondence are different. Therefore, when a quantity of enabled PAs is small, in other words, when a quantity of enabled Tx channels is small, the foregoing transmitting system can achieve an effect of energy saving, and is applicable to a scenario in which network load is low. When all PAs are enabled or the quantity of enabled PAs is large, in other words, when all Tx channels are enabled or the quantity of enabled Tx channels is large, the foregoing transmitting system is applicable to a scenario in which the network load is high. In addition, regardless of the quantity of enabled PAs in the downlink transmitting system, all antenna bays in the downlink transmitting system are in an enabled state. Therefore, a scale of the antenna array is not reduced, and performance of the downlink transmitting system is not affected.

With reference to the third aspect, in some implementations of the third aspect, the at least two connection states include a first connection state and a second connection state, and a quantity of enabled PAs in the first connection state is greater than a quantity of enabled PAs in the second connection state. When a connection state of a first switching switch is the first connection state, a plurality of PAs in a first PA group are connected to a plurality of antenna bays in a first antenna bay group in a one-to-one correspondence, the first PA group and the first antenna bay group are connected through the first switching switch, and the first switching switch is any one of the at least one switching switch. When the connection state of the first switching switch is the second connection state, at least one first PA in the first PA group is connected to at least two antenna bays in the first antenna bay group, and at least one second PA in the first PA group is not connected to all antenna bays in the first antenna bay group.

With reference to the third aspect, in some implementations of the third aspect, a connection state of at least one of the at least one switching switch is the first connection state when a first condition is met, and the first condition includes at least one of the following conditions: A quantity of users served by the downlink transmitting system is greater than or equal to a first threshold; and a vertical spacing between at least two of the users relative to a ground is greater than or equal to a second threshold.

With reference to the third aspect, in some implementations of the third aspect, a connection state of at least one of the at least one switching switch is the second connection state when a second condition is met, and the second condition is as follows: A quantity of users served by the downlink transmitting system is less than a first threshold, and a vertical spacing between any two of the users relative to a ground is less than a second threshold.

With reference to the third aspect, in some implementations of the third aspect, the downlink transmitting system further includes a baseband processor, and the baseband processor is configured to control a connection state of each of the at least one switching switch.

With reference to the third aspect, in some implementations of the third aspect, the switching switch is a bridge.

With reference to the third aspect, in some implementations of the third aspect, the downlink transmitting system further includes a plurality of phase shifters, and the plurality of phase shifters are connected to a plurality of antenna bays included in the downlink transmitting system in a one-to-one correspondence.

Based on the foregoing downlink transmitting system, the phase shifter may perform analog weighting between different antenna bays included in the antenna array. Therefore, coverage of a vertical beam of the downlink transmitting system can be expanded.

According to a fourth aspect, a switching method is provided and applied to a downlink transmitting system. The downlink transmitting system includes: at least one digital intermediate frequency module group, at least one Tx port group, a plurality of PAs, at least one switching switch, and an antenna array. The plurality of PAs are connected to the antenna array. The plurality of PAs are connected to all Tx ports included in the at least one Tx port group in a one-to-one correspondence. The at least one digital intermediate frequency module group is in a one-to-one correspondence with the at least one Tx port group. Each Tx port group is connected to each digital intermediate frequency module in a corresponding digital intermediate frequency module group through one switching switch. Each Tx port group includes a plurality of Tx ports. A quantity of digital intermediate frequency modules included in each digital intermediate frequency module group is equal to a quantity of Tx ports included in a corresponding Tx port group. Each switching switch includes at least two connection states. Quantities of enabled digital intermediate frequency modules in a digital intermediate frequency module group connected to the switching switch in different connection states are different. All Tx ports in a Tx port group connected to the switching switch in the different connection states are in an enabled state.

The method includes: controlling a connection state of the at least one switching switch based on a quantity of served users and a vertical spacing between different users relative to a ground.

With reference to the fourth aspect, in some implementations of the fourth aspect, the at least two connection states include a first connection state and a second connection state, and a quantity of enabled digital intermediate frequency modules in the first connection state is greater than a quantity of enabled digital intermediate frequency modules in the second connection state. When a connection state of a first switching switch is the first connection state, a plurality of Tx ports in a first Tx port group are connected to a plurality of digital intermediate frequency modules in a first digital intermediate frequency module group in a one-to-one correspondence, the first Tx port group and the first digital intermediate frequency module group are connected through the first switching switch, and the first switching switch is any one of the at least one switching switch. When the connection state of the first switching switch is the second connection state, at least one first digital intermediate frequency module in the first digital intermediate frequency module group is connected to at least two Tx ports in the first Tx port group, and at least one second digital intermediate frequency module in the first digital intermediate frequency module group is not connected to all Tx ports in the first Tx port group.

With reference to the fourth aspect, in some implementations of the fourth aspect, the controlling a connection state of the at least one switching switch based on a quantity of served users and a vertical spacing between different users relative to a ground includes: when a first condition is met, controlling a connection state of at least one of the at least one switching switch to be the first connection state. The first condition includes at least one of the following conditions: The quantity of users served by the downlink transmitting system is greater than or equal to a first threshold; and a vertical spacing between at least two of the users relative to the ground is greater than or equal to a second threshold.

With reference to the fourth aspect, in some implementations of the fourth aspect, the controlling a connection state of the at least one switching switch based on a quantity of served users and a spacing between different users includes: when a second condition is met, controlling a connection state of at least one of the at least one switching switch to be the second connection state. The second condition is as follows: The quantity of users served by the downlink transmitting system is less than a first threshold, and a vertical spacing between any two of the users relative to the ground is less than a second threshold.

With reference to the fourth aspect, in some implementations of the fourth aspect, the method further includes: determining the quantity of users and the vertical spacing between the different users relative to the ground based on a received channel state information beam identifier.

According to a fifth aspect, a switching method is provided and applied to a downlink transmitting system. The downlink transmitting system includes: at least one Tx channel group, at least one PA group, at least one switching switch, and an antenna array. The at least one PA group is connected to the antenna array. The at least one Tx channel group is in a one-to-one correspondence with the at least one PA group. Each Tx channel is connected to each PA in a corresponding PA group through one switching switch. Each Tx channel group includes a plurality of Tx channels. Each Tx channel includes a Tx port and a digital intermediate frequency module. A quantity of PAs included in each PA group is equal to a quantity of Tx channels included in a corresponding Tx channel group. Each switching switch includes at least two connection states. Quantities of enabled Tx channels in a Tx channel group connected to the switching switch in different connection states are different. All PAs in a PA group connected to the switching switch in the different connection states are in an enabled state.

The method includes: controlling a connection state of the at least one switching switch based on a quantity of served users and a vertical spacing between different users relative to a ground.

With reference to the fifth aspect, in some implementations of the fifth aspect, the at least two connection states include a first connection state and a second connection state, and a quantity of enabled Tx channels in the first connection state is greater than a quantity of enabled Tx channels in the second connection state. When a connection state of a first switching switch is the first connection state, a plurality of Tx channels in a first Tx channel group are connected to a plurality of PAs in a first PA group in a one-to-one correspondence, the first Tx channel group and the first PA group are connected through the first switching switch, and the first switching switch is any one of the at least one switching switch. When the connection state of the first switching switch is the second connection state, at least one first Tx channel in the first Tx channel group is connected to at least two PAs in the first PA group, and at least one second Tx channel in the first Tx channel group is not connected to all PAs in the first PA group.

With reference to the fifth aspect, in some implementations of the fifth aspect, the controlling a connection state of the at least one switching switch based on a quantity of served users and a vertical spacing between different users relative to a ground includes: when a first condition is met, controlling a connection state of at least one of the at least one switching switch to be the first connection state. The first condition includes at least one of the following conditions: The quantity of users served by the downlink transmitting system is greater than or equal to a first threshold; and a vertical spacing between at least two of the users relative to the ground is greater than or equal to a second threshold.

With reference to the fifth aspect, in some implementations of the fifth aspect, the controlling a connection state of the at least one switching switch based on a quantity of served users and a spacing between different users includes: when a second condition is met, controlling a connection state of at least one of the at least one switching switch to be the second connection state. The second condition is as follows: The quantity of users served by the downlink transmitting system is less than a first threshold, and a vertical spacing between any two of the users relative to the ground is less than a second threshold.

With reference to the fifth aspect, in some implementations of the fifth aspect, the method further includes: determining the quantity of users and the vertical spacing between the different users relative to the ground based on a received channel state information beam identifier.

According to a sixth aspect, a switching method is provided and applied to a downlink transmitting system. The downlink transmitting system includes: a plurality of Tx channels, at least one PA group, at least one switching switch, and an antenna array. The antenna array includes at least one antenna bay group. The at least one PA group is in a one-to-one correspondence with the at least one antenna bay group. Each PA group is connected to each antenna bay in a corresponding antenna bay group through one switching switch. Each PA group includes a plurality of PAs. A quantity of PAs included in each PA group is equal to a quantity of antenna bays included in a corresponding antenna bay group. Each switching switch includes at least two connection states. Quantities of enabled PAs in a PA group connected to the switching switch in different connection states are different. All antenna bays in an antenna bay group connected to the switching switch in the different connection states are in an enabled state.

The method includes: controlling a connection state of the at least one switching switch based on a quantity of served users and a vertical spacing between different users relative to a ground.

With reference to the sixth aspect, in some implementations of the sixth aspect, the at least two connection states include a first connection state and a second connection state, and a quantity of enabled PAs in the first connection state is greater than a quantity of enabled PAs in the second connection state. When a connection state of a first switching switch is the first connection state, a plurality of PAs in a first PA group are connected to a plurality of antenna bays in a first antenna bay group in a one-to-one correspondence, the first PA group and the first antenna bay group are connected through the first switching switch, and the first switching switch is any one of the at least one switching switch. When the connection state of the first switching switch is the second connection state, at least one first PA in the first PA group is connected to at least two antenna bays in the first antenna bay group, and at least one second PA in the first PA group is not connected to all antenna bays in the first antenna bay group.

With reference to the sixth aspect, in some implementations of the sixth aspect, the controlling a connection state of the at least one switching switch based on a quantity of served users and a vertical spacing between different users relative to a ground includes: when a first condition is met, controlling a connection state of at least one of the at least one switching switch to be the first connection state. The first condition includes at least one of the following conditions: The quantity of users served by the downlink transmitting system is greater than or equal to a first threshold; and a vertical spacing between at least two of the users relative to the ground is greater than or equal to a second threshold.

With reference to the sixth aspect, in some implementations of the sixth aspect, the controlling a connection state of the at least one switching switch based on a quantity of served users and a spacing between different users includes: when a second condition is met, controlling a connection state of at least one of the at least one switching switch to be the second connection state. The second condition is as follows: The quantity of users served by the downlink transmitting system is less than a first threshold, and a vertical spacing between any two of the users relative to the ground is less than a second threshold.

With reference to the sixth aspect, in some implementations of the sixth aspect, the method further includes: determining the quantity of users and the vertical spacing between the different users relative to the ground based on a received channel state information beam identifier.

DESCRIPTION OF EMBODIMENTS

The following describes technical solutions of this application with reference to accompanying drawings.

A massive multiple-input multiple-output (Massive MIMO) technology is a key technology of a current 5th generation (5G) mobile communication system. In this technology, a large-scale antenna array is deployed on a network device to improve a system throughput. However, because a massive MIMO device uses a large quantity of transceiver units (TRxs) (for example, 32 TRxs or 64 TRxs are used), energy consumption of the network device increases sharply. Particularly, when load of the network device is low, enabling of a large quantity of transmit (Tx) channels makes an energy efficiency ratio of the network device significantly lower than an energy efficiency ratio of the network device with medium and high load.

Figure 1:
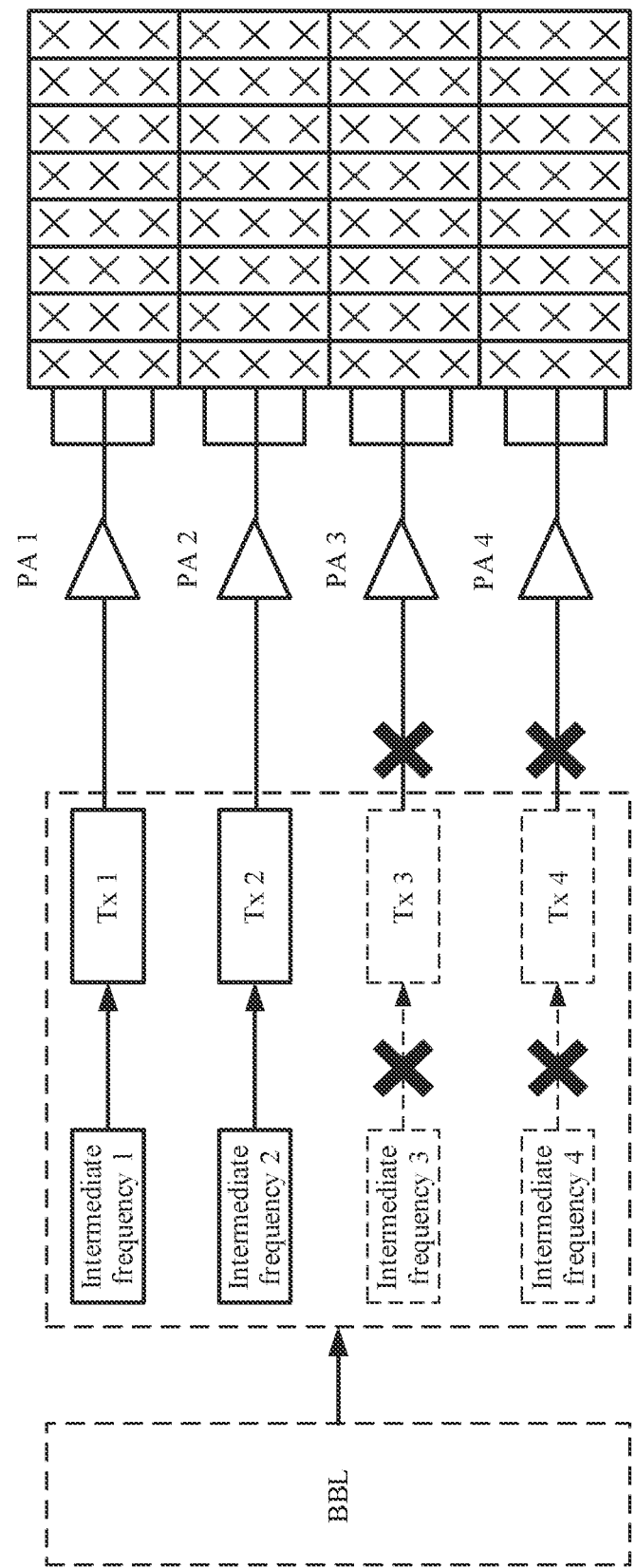
FIG. 1 is a schematic diagram of a structure of a downlink transmitting system using DBF.

FIG. 1 shows an architecture of a downlink transmitting system using digital beamforming (DBF). As shown in FIG. 1, when load of a network device is low, a part of Tx channels may be disabled to save energy. For example, in FIG. 1, a Tx channel may be disabled by disconnecting a Tx 3 from an intermediate frequency (namely, a digital intermediate frequency module, which is denoted as an intermediate frequency below) 3 and a power amplifier (PA) 3, and another Tx channel may be disabled by disconnecting a Tx 4 from an intermediate frequency 4 and a PA 4.

As shown in FIG. 1, in a process of disabling the part of Tx channels, the Tx channels are also disconnected from a part of an antenna array. In this case, a scale of the antenna array is reduced. Furthermore, reduction in the scale of the antenna array causes damage to an aperture of the antenna array and reduction in an effective isotropic radiated power (EIRP) of the network device. Consequently, performance and coverage of the network device are reduced to different extent.

Figure 2:
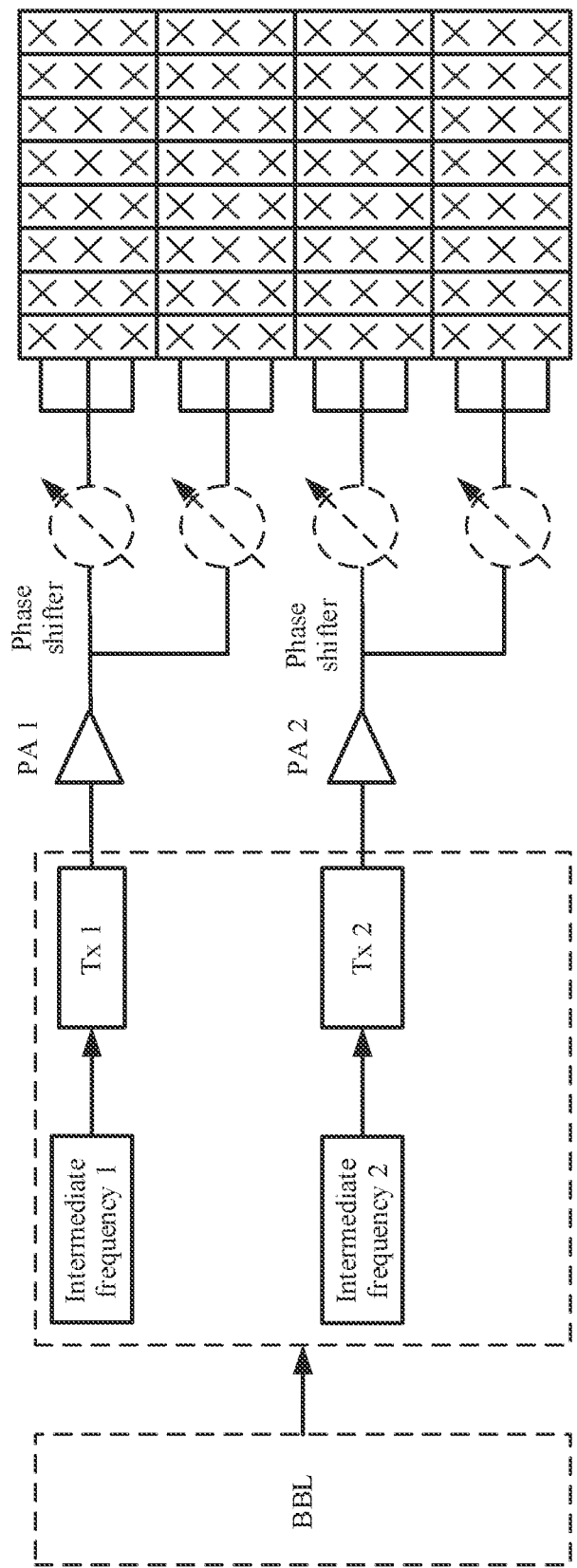
FIG. 2 is a schematic diagram of a structure of a downlink transmitting system using HBF.

FIG. 2 shows an architecture of a downlink transmitting system using hybrid beamforming (HBF). Compared with the architecture of the downlink transmitting system using DBF shown in FIG. 1, for the architecture of the downlink transmitting system using HBF shown in FIG. 2, a quantity of Tx channels and a quantity of PAs are reduced by half. Correspondingly, for a vertical array driven by one Tx channel and one PA, that 1 channel drives 3 antenna elements is changed to that 1 channel drives 6 antenna elements. To be specific, as shown in FIG. 2, a quantity of rows of an antenna array connected to one Tx channel and one PA is increased from 3 to 6.

In the architecture of the downlink transmitting system using HBF shown in FIG. 2, because the quantity of Tx channels is reduced, an effect of energy saving is achieved to some extent when load of a network device is low, and a loss of performance is small. However, when the load of the network device is high or a vertical distribution spacing between users relative to a ground is large, the performance of the architecture of the downlink transmitting system using HBF is significantly poorer than performance of the architecture of the downlink transmitting system using DBF.

In view of this, an embodiment of this application provides a downlink transmitting system. The downlink transmitting system can adjust a quantity of Tx channels based on an application scenario, without causing damage to an aperture of an antenna array.

The following describes the technical solutions of this application with reference to the accompanying drawings.

In embodiments shown below, "first", "second", "third" and various numbers are merely used for distinguishing for ease of description, and are not used to limit the scope of embodiments of this application. For example, the numbers are used to distinguish between different PAs, different phase shifters, and the like. In addition, "including" and "having" and any variations thereof are intended to cover non-exclusive inclusion. For example, a process, method, system, product, or device that includes a series of steps or units further includes another inherent step or unit.

The technical solutions in embodiments of this application may be applied to various communication systems, such as a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) mobile communication system or a new radio access technology (NR) system, a 6th generation (6G) mobile communication system, or a future evolved communication system. The 5G mobile communication system may include a non-standalone (NSA) communication system and/or a standalone (SA) communication system.

Figure 3:
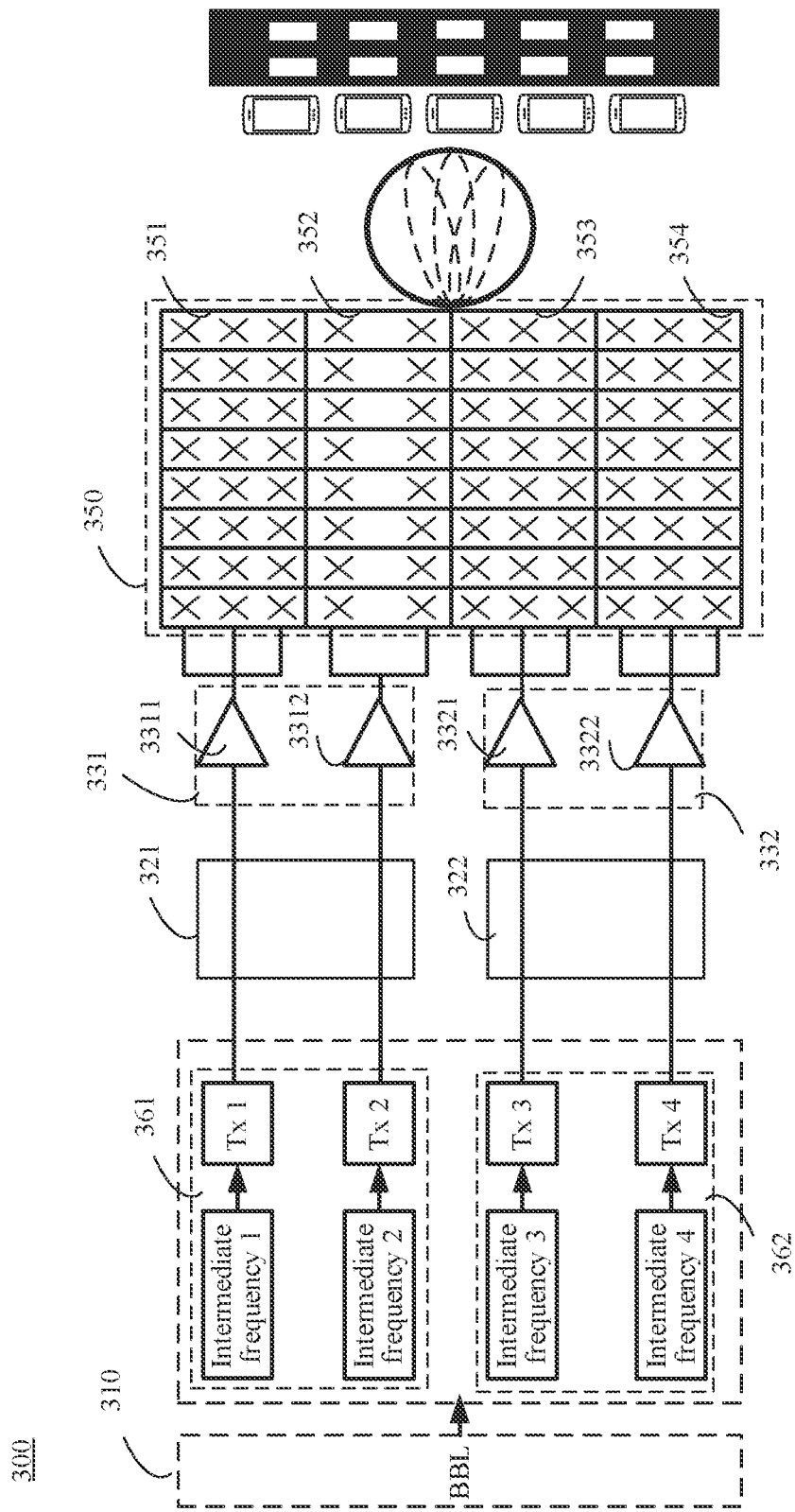
FIG. 3 to FIG. 28 are schematic diagrams of structures of downlink transmitting systems according to embodiments of this application.

FIG. 3 is a schematic diagram of a structure of a downlink transmitting system 300 according to an embodiment of this application. The downlink transmitting system 300 may include: at least one Tx channel group (for example, a Tx channel group 361 and a Tx channel group 362 in FIG. 3), at least one PA group (for example, a PA group 331 and a PA group 332 in FIG. 3), at least one switching switch (for example, a switching switch 321 and a switching switch 322 in FIG. 3), and an antenna array 350.

The antenna array 350 may include a plurality of antenna bays (for example, an antenna bay 351 to an antenna bay 354 in FIG. 3). A quantity of rows of antenna elements included in each antenna bay is not limited in this embodiment of this application. For example, the antenna bay 351 includes three rows of antenna elements, and an antenna bay 352 includes two rows of antenna elements.

The at least one PA group is connected to the antenna array 350, and each PA in all PAs included in the at least one PA group is connected to one antenna bay in the antenna array 350. For example, in FIG. 3, a PA 3311 is connected to the antenna bay 351, and a PA 3312 is connected to the antenna bay 352. A PA 3321 is connected to an antenna bay 353, and a PA 3322 is connected to the antenna bay 354.

Each Tx channel may include an intermediate frequency and a Tx port. For example, in FIG. 3, a $1^{st}$ Tx channel may include an intermediate frequency 1 and a Tx port 1, a $2^{nd}$ Tx channel may include an intermediate frequency 2 and a Tx port 2, a $3^{rd}$ Tx channel may include an intermediate frequency 3 and a Tx port 3, and a $4^{th}$ Tx channel may include an intermediate frequency 4 and a Tx port 4.

The at least one Tx channel group is in a one-to-one correspondence with the at least one PA group, and each Tx channel group is connected to each PA in a corresponding PA group through one switching switch. For example, in FIG. 3, the Tx channel group 361 corresponds to the PA group 331, and the Tx channel group 361 is connected to each PA in the PA group 331 through the switching switch 321. The Tx channel group 362 corresponds to the PA group 332, and the Tx channel group 362 is connected to each PA in the PA group 332 through the switching switch 322.

Each of the at least one Tx channel group includes a plurality of Tx channels, and a quantity of Tx channels included in each Tx channel group is equal to a quantity of PAs included in a corresponding PA group.

For example, in FIG. 3, the Tx channel group 361 and the Tx channel group 362 each include 2 Tx channels, a quantity of Tx channels included in the Tx channel group 361 and a quantity of PAs included in the PA group 331 are both 2, and a quantity of Tx channels included in the Tx channel group 362 and a quantity of PAs included in the PA group 332 are both 2.

Figure 4:
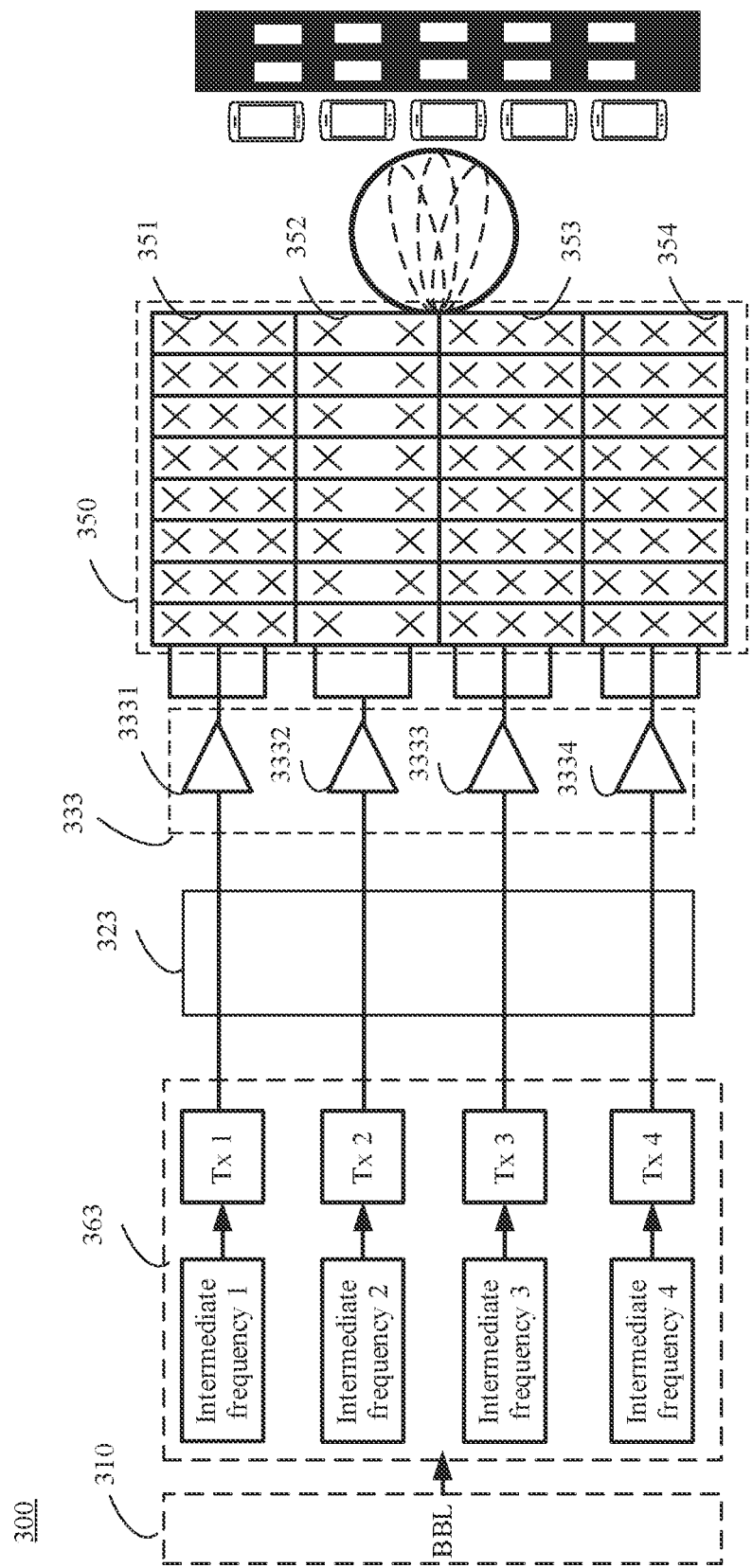

For another example, in FIG. 4, a quantity of Tx channels included in a Tx channel group 363 is 4, and the quantity of Tx channels included in the Tx channel group 363 and a quantity of PAs included in a PA group 333 are both 4.

Optionally, each of the at least one Tx channel group may include a same quantity of Tx channels. For example, in FIG. 3, the quantity of Tx channels included in the Tx channel group 361 and the quantity of Tx channels included in the Tx channel group 362 are both 2.

Optionally, each of the at least one Tx channel group may include a different quantity of Tx channels. For example, in FIG. 5, a quantity of Tx channels included in a Tx channel group 361 is 2, but a quantity of Tx channels included in a Tx channel group 363 is 4.

Each of the at least one switching switch includes at least two connection states, and quantities of enabled Tx channels in a Tx channel group connected to the switching switch in different connection states are different. In other words, the downlink transmitting system 300 includes the at least two connection states.

The at least two connection states may include a first connection state and a second connection state, and a quantity of enabled Tx channels in the first connection state is greater than a quantity of enabled Tx channels in the second connection state.

When a connection state of a first switching switch is the first connection state, a plurality of Tx channels in a first Tx channel group are connected to a plurality of PAs in a first PA group in a one-to-one correspondence, the first Tx channel group and the first PA group are connected through the first switching switch, and the first switching switch is any one of the at least one switching switch.

For example, in FIG. 3, the first switching switch may be the switching switch 321, the first Tx channel group is the Tx channel group 361, and the first PA group is the PA group 331. When a connection state of the switching switch 321 is the first connection state, two Tx channels in the Tx channel group 361 are connected to two PAs in the PA group 331 in a one-to-one correspondence. To be specific, the $1^{st}$ Tx channel is correspondingly connected to the PA 3311, and the $2^{nd}$ Tx channel is correspondingly connected to the PA 3312. Alternatively, the first switching switch may be the switching switch 322, the first Tx channel group is the Tx channel group 362, and the first PA group is the PA group 332. When a connection state of the switching switch 322 is the first connection state, two Tx channels in the Tx channel group 362 are connected to two PAs in the PA group 332 in a one-to-one correspondence. To be specific, the $3^{rd}$ Tx channel is correspondingly connected to the PA 3321, and the $4^{th}$ Tx channel is correspondingly connected to the PA 3322.

For example, in FIG. 4, the first switching switch may be a switching switch 323, the first Tx channel group is the Tx channel group 363, and the first PA group is the PA group 333. When a connection state of the switching switch 323 is the first connection state, four Tx channels in the Tx channel group 363 are connected to four PAs in the PA group 333 in a one-to-one correspondence. To be specific, a $1^{st}$ Tx channel is correspondingly connected to a PA 3331, a $2^{nd}$ Tx channel is correspondingly connected to a PA 3332, a $3^{rd}$ Tx channel is correspondingly connected to a PA 3333, and a $4^{th}$ Tx channel is correspondingly connected to a PA 3334.

Figure 5:
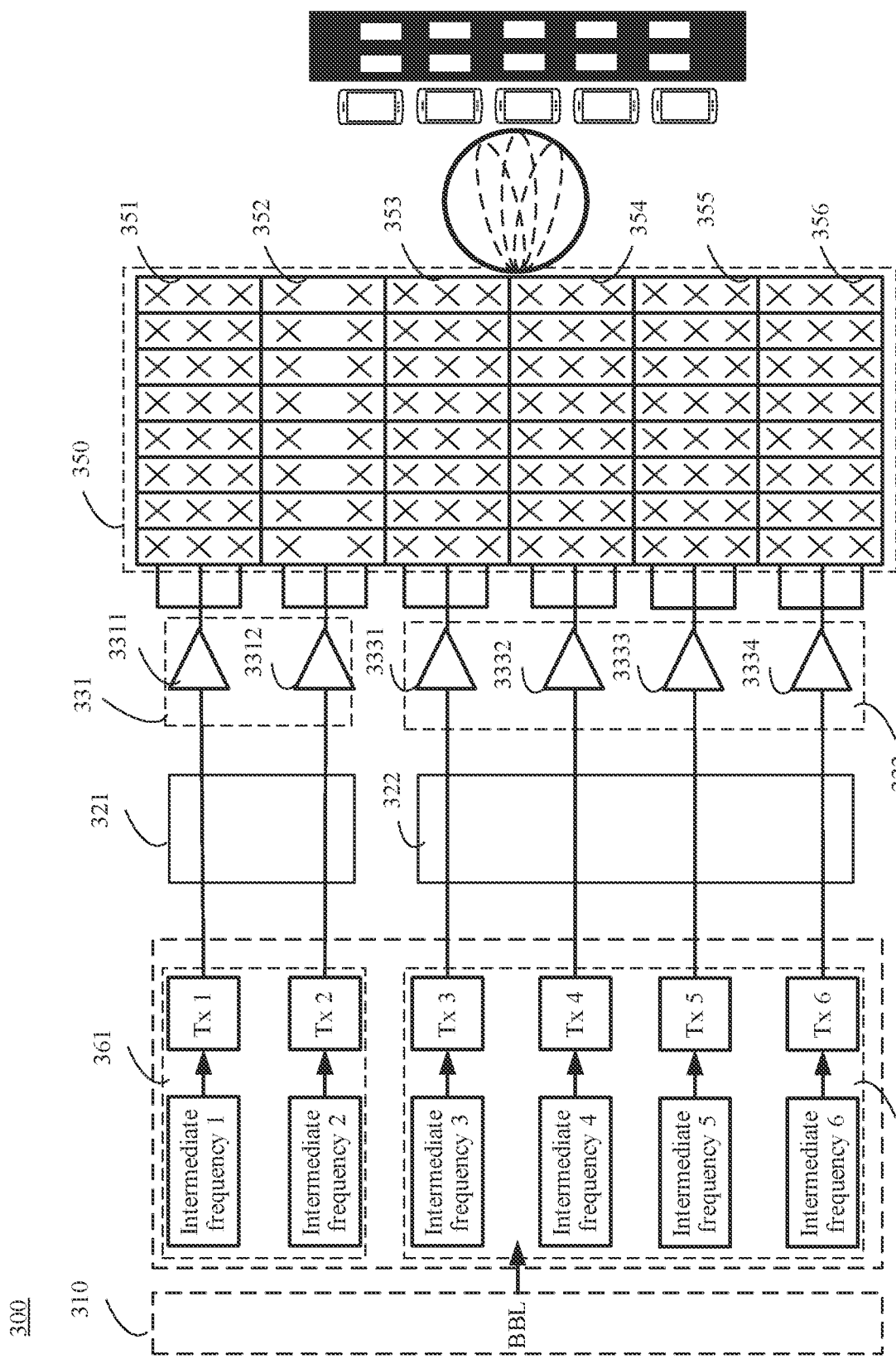

If connection states of all switching switches in the at least one switching switch are the first connection state, it may be considered that the downlink transmitting system 300 is in the first connection state. It can be learned that downlink transmitting systems 300 shown in FIG. 3 to FIG. 5 are in the first connection state.

When the connection state of the first switching switch is the second connection state, at least one first Tx channel in the first Tx channel group is connected to at least two PAs in the first PA group, and at least one second Tx channel in the first Tx channel group is not connected to all PAs in the first PA group. It may be understood that, when the second Tx channel is not connected to all the PAs in the first PA group, the second Tx channel is in a disabled state.

Figure 6:
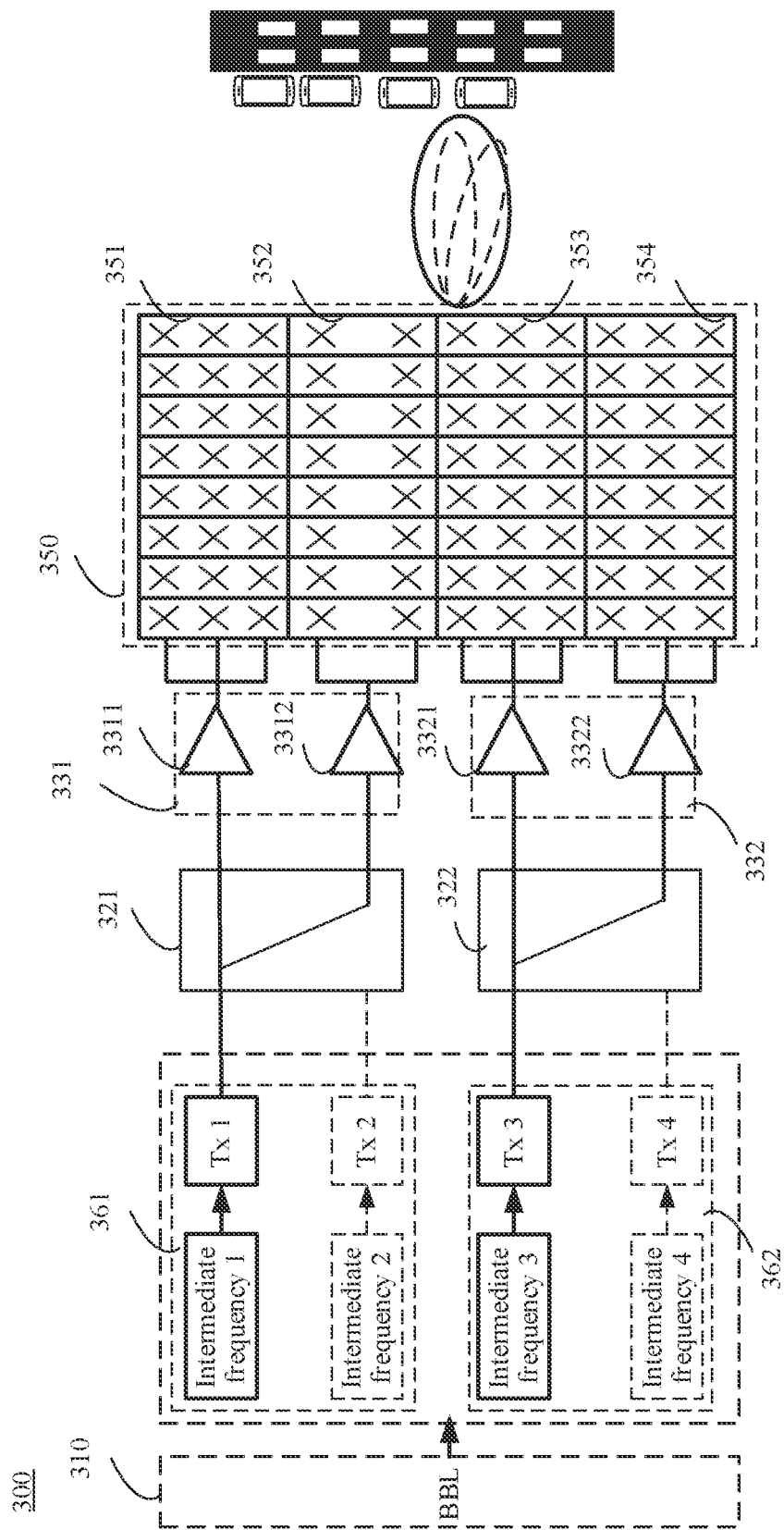

For example, in FIG. 6, the first switching switch may be a switching switch 321, the first Tx channel group is a Tx channel group 361, the first PA group is a PA group 331, the first Tx channel is a $1^{st}$ Tx channel, and the second Tx channel is a $2^{nd}$ Tx channel. When a connection state of the switching switch 321 is the second connection state, the $1^{st}$ Tx channel is connected to two PAs (namely, a PA 3311 and a PA 3312) in the PA group 331, and the $2^{nd}$ Tx channel is in a disabled state. Alternatively, the first switching switch may be a switching switch 322, the first Tx channel group is a Tx channel group 362, the first PA group is a PA group 332, the first Tx channel is a $3^{rd}$ Tx channel, and the second Tx channel is a $4^{th}$ Tx channel. When a connection state of the switching switch 322 is the second connection state, the $3^{rd}$ Tx channel is connected to two PAs (namely, a PA 3321 and a PA 3322) in the PA group 332, and the $4^{th}$ Tx channel is in a disabled state.

Figure 7:
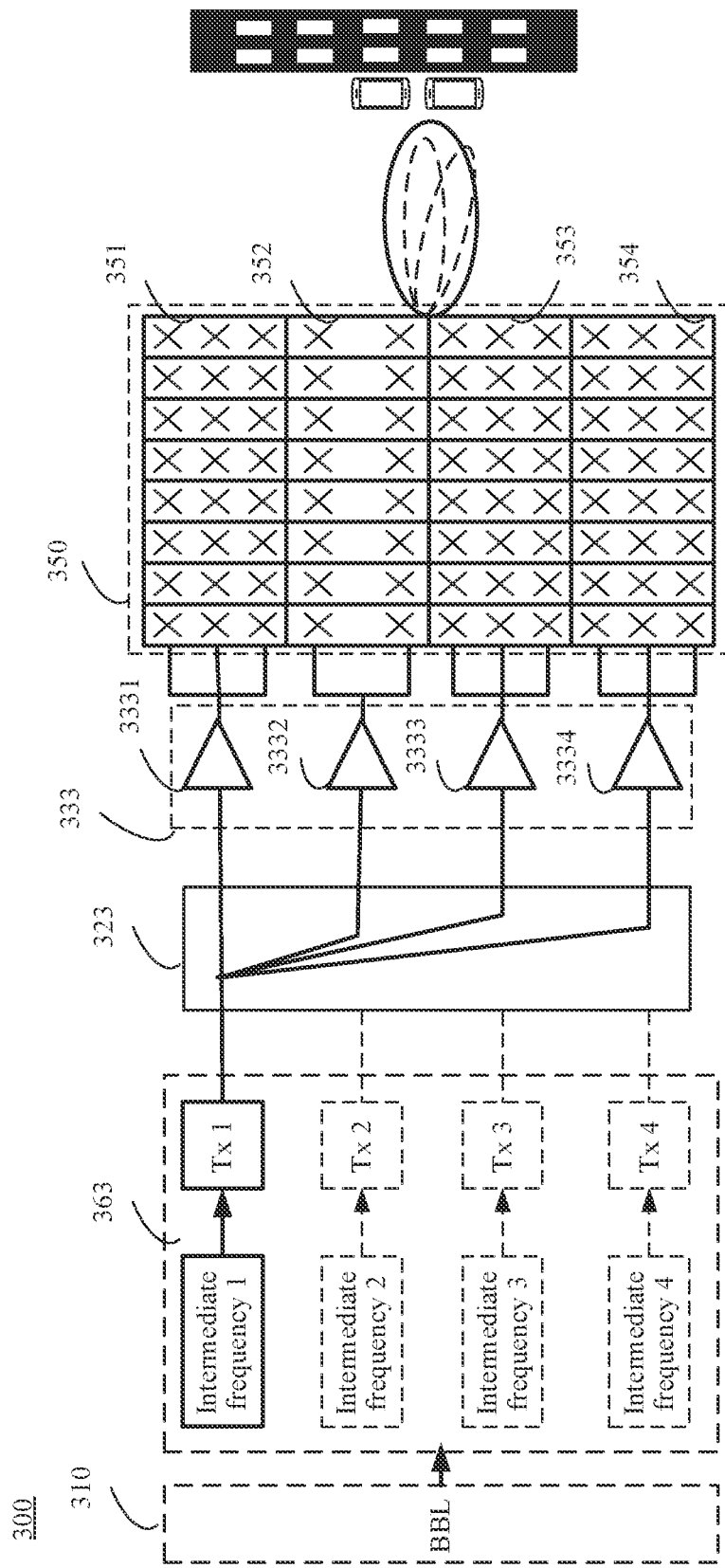

For example, in FIG. 7, the first switching switch may be a switching switch 323, the first Tx channel group is a Tx channel group 363, the first PA group is a PA group 333, the first Tx channel is a $1^{st}$ Tx channel, and the second Tx channel is a $2^{nd}$ Tx channel to a $4^{th}$ Tx channel. When a connection state of the switching switch 323 is the second connection state, the $1^{st}$ Tx channel is connected to four PAs (namely, a PA 3331 to a PA 3334) in the PA group 333, and the $2^{nd}$ Tx channel to the $4^{th}$ Tx channel are in a disabled state.

Figure 8:
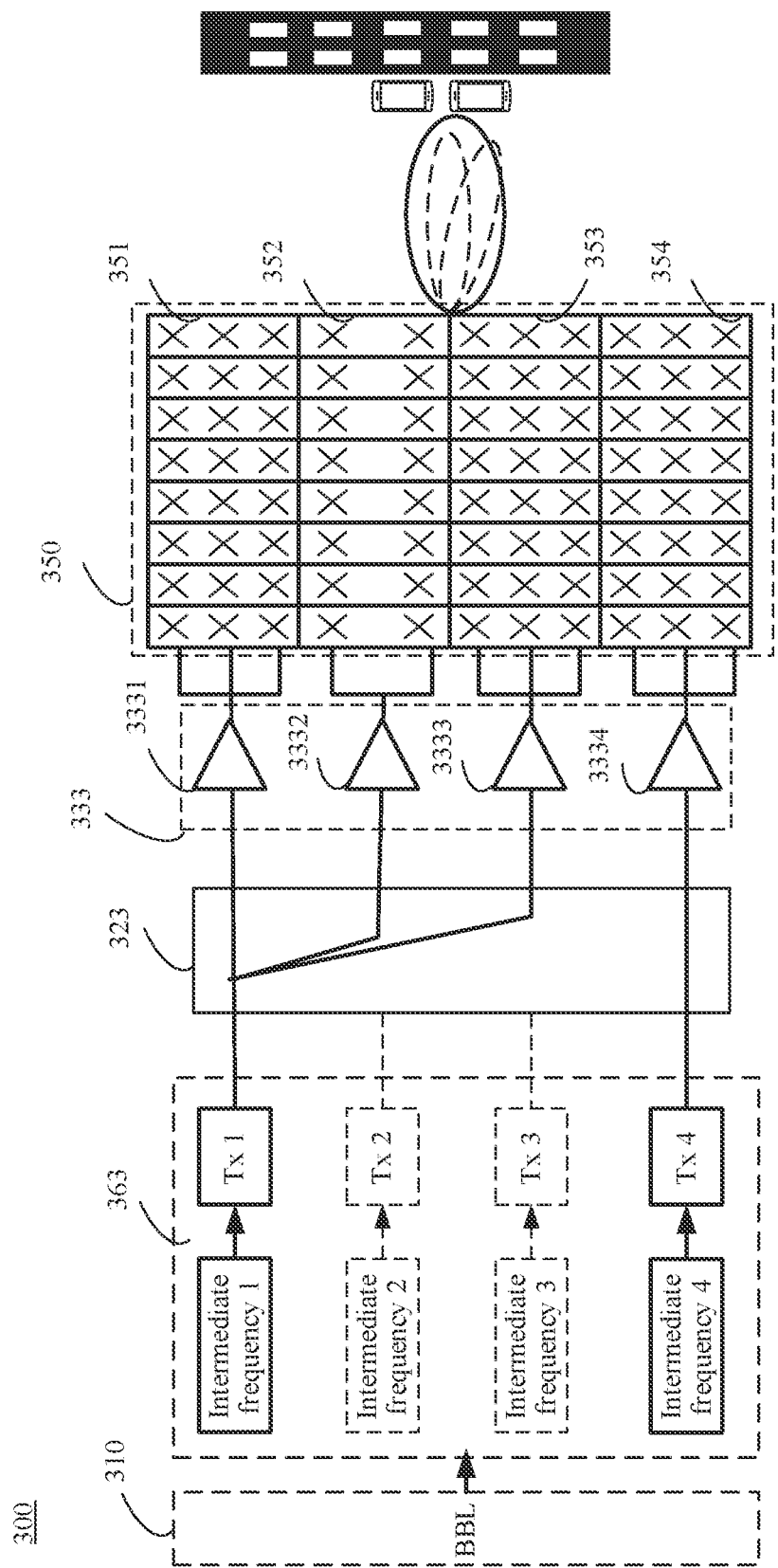

For example, in FIG. 8, the first switching switch may be a switching switch 323, the first Tx channel group is a Tx channel group 363, the first PA group is a PA group 333, the first Tx channel is a $1^{st}$ Tx channel, and the second Tx channel is a $2^{nd}$ Tx channel and a $3^{rd}$ Tx channel. When a connection state of the switching switch 323 is the second connection state, the $1^{st}$ Tx channel is connected to three PAs (namely, a PA 3331 to a PA 3333) in the PA group 333, the $2^{nd}$ Tx channel and the $3^{rd}$ Tx channel are in a disabled state, and a $4^{th}$ Tx channel may still be connected to a PA 3334.

If a connection state of at least one of the at least one switching switch is the second connection state, it may be considered that the downlink transmitting system 300 is in the second connection state. It can be learned that downlink transmitting systems 300 shown in FIG. 6 to FIG. 8 are in the second connection state.

As shown in FIG. 3 to FIG. 8, the downlink transmitting system 300 may further include a baseband processor 310 (for example, may be a baseband lower (BBL)), and a connection state of each of the at least one switching switch may be controlled by the baseband processor. For example, the baseband processor may control the connection state of the switching switch based on a quantity of users served by the downlink transmitting system 300 and a vertical spacing between different users relative to a ground.

For example, when a first condition is met, the baseband processor controls the connection state of the at least one of the at least one switching switch to be the first connection state, where the first condition includes at least one of the following conditions:

The quantity of users served by the downlink transmitting system 300 is greater than or equal to a first threshold; and
   a vertical spacing between at least two of the users served by the downlink transmitting system 300 relative to the ground is greater than or equal to a second threshold.

For another example, when a second condition is met, the baseband processor controls the connection state of the at least one of the at least one switching switch to be the second connection state, where the second condition is as follows:

The quantity of users served by the downlink transmitting system 300 is less than a first threshold, and a vertical spacing between any two of the users served by the downlink transmitting system 300 relative to the ground is less than a second threshold.

Optionally, when the second condition is met, the baseband processor is further configured to determine whether the users are distributed within coverage of the downlink transmitting system in the second connection state. If the users are distributed within the coverage of the downlink transmitting system in the second connection state, the baseband processor controls the connection state of the at least one of the at least one switching switch to be the second connection state. Alternatively, if the users are distributed outside the coverage of the downlink transmitting system in the second connection state, the baseband processor controls the connection state of the at least one of the at least one switching switch to be the first connection state.

For example, with reference to the downlink transmitting systems 300 shown in FIG. 3 and FIG. 6 (where a quantity of Tx channels included in each Tx channel group and a quantity of PAs included in each PA group are both 2), if the downlink transmitting system 300 includes 64 Tx channels, the downlink transmitting system 300 in the first connection state may be referred to as 64 DBF. If a connection state of each switching switch in the downlink transmitting system 300 is the second connection state, a quantity of enabled Tx channels is 32, and the downlink transmitting system 300 in the second connection state may be referred to as 32 DBF. Therefore, when the second condition is met, the baseband processor is further configured to determine whether the users are distributed within coverage of the 32 DBF. If the users (for example, $3^{rd}$ and $4^{th}$ users counted from top to bottom in FIG. 6) are distributed within the coverage of the 32 DBF, the baseband processor controls the switching switch to enable the downlink transmitting system 300 to be in the second connection state. If the users (for example, $1^{st}$ and $2^{nd}$ users counted from top to bottom in FIG. 6) are not distributed within the coverage of the 32 DBF, the baseband processor controls the switching switch to enable the downlink transmitting system 300 to be in the first connection state.

A method for determining, by the baseband processor, the quantity of users served by the downlink transmitting system 300 and the spacing between the different users is not limited in this embodiment of this application. For example, the baseband processor may determine the quantity of users and the spacing between the different users based on a received channel state information (CSI) beam identifier (ID).

It should be understood that FIG. 3 to FIG. 8 are merely examples, and show four or six Tx channels, four or six PAs, and one or two switching switches. Optionally, the downlink transmitting system 300 may include K Tx channels, K PAs, and L switching switches, where K is an integer greater than 1, and L is a positive integer.

Figure 9:
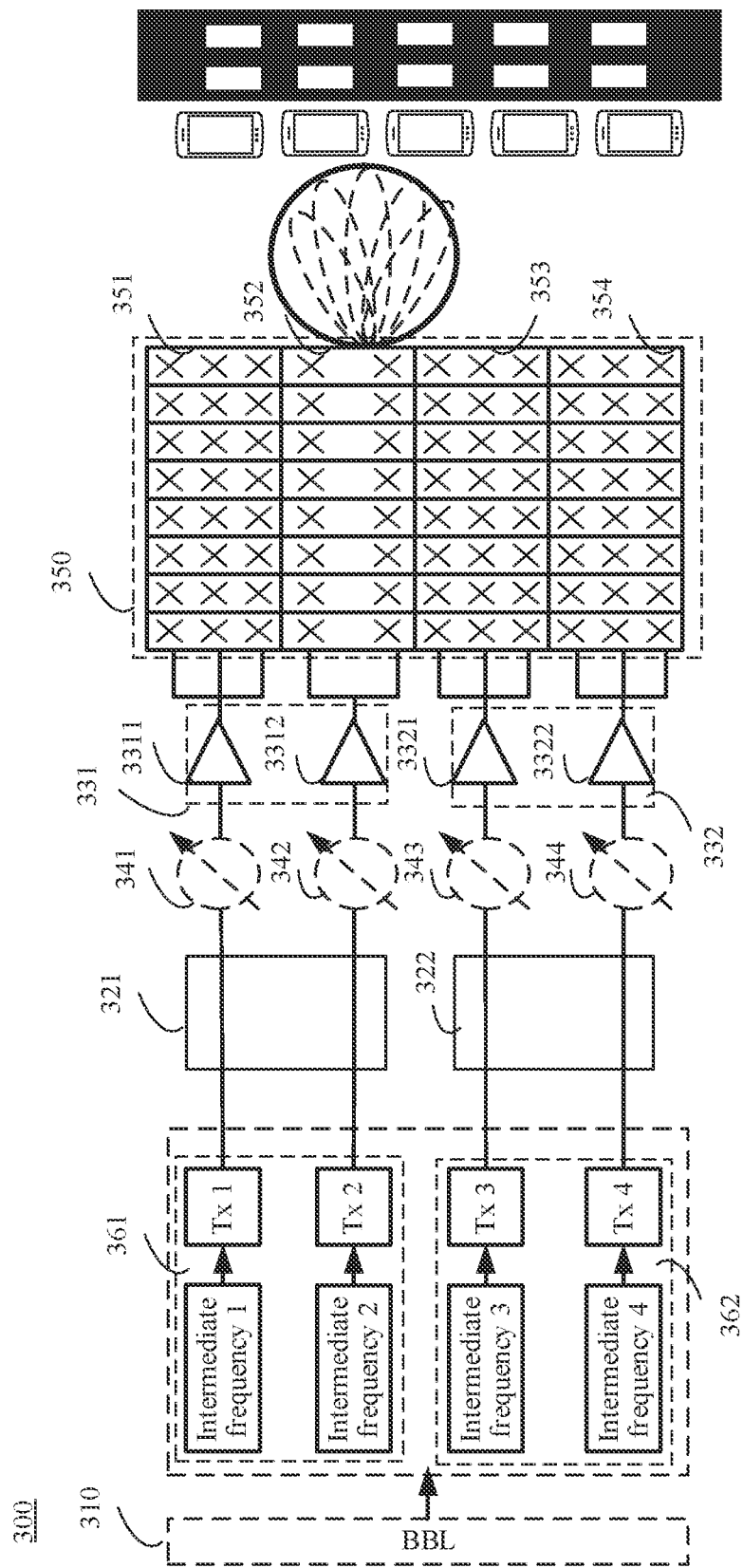
Figure 10:
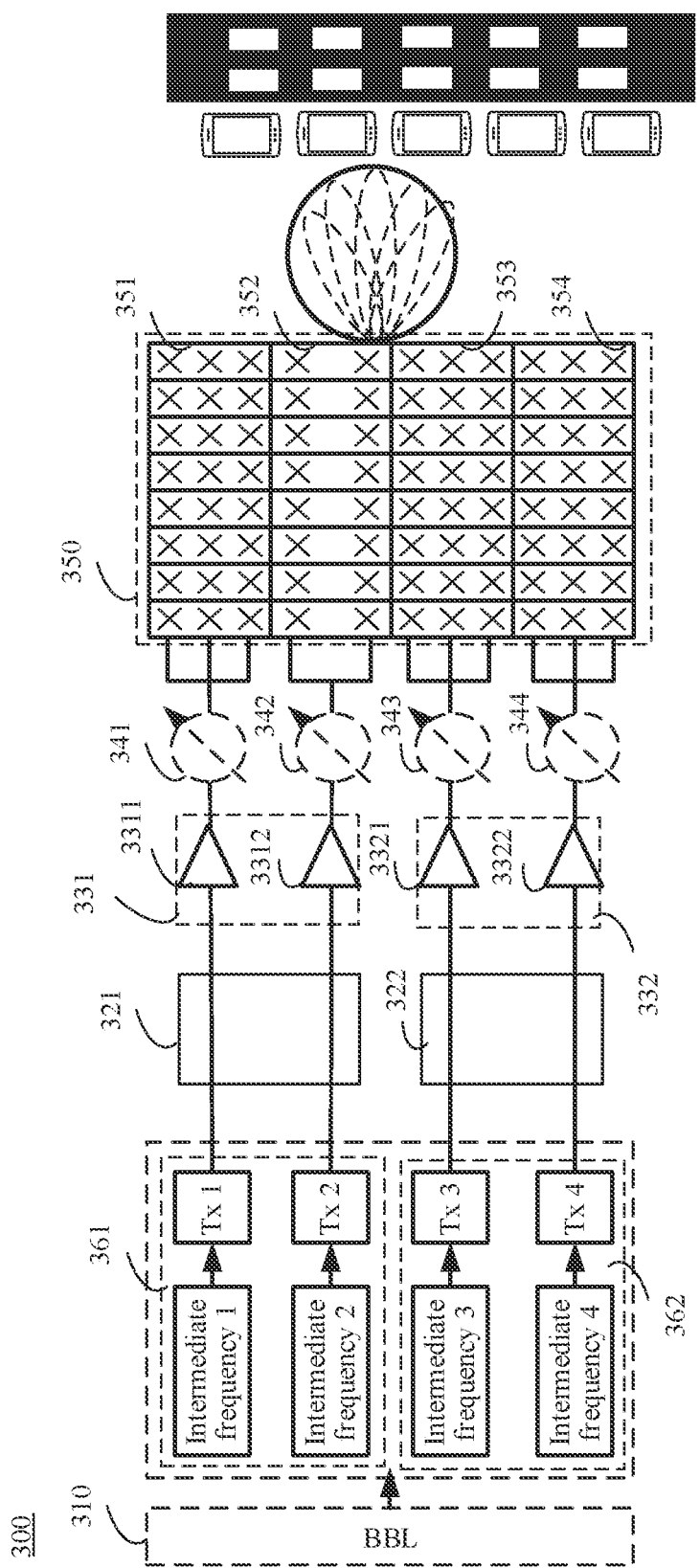

Optionally, as shown in FIG. 9 and FIG. 10, the downlink transmitting system 300 may further include a plurality of phase shifters (a phase shifter 341 to a phase shifter 344 in FIG. 9 and FIG. 10). The plurality of phase shifters are connected to all PAs included in the at least one PA group in a one-to-one correspondence. For example, in FIG. 9 and FIG. 10, a PA 3311 is correspondingly connected to the phase shifter 341, a PA 3312 is correspondingly connected to a phase shifter 342, a PA 3321 is correspondingly connected to a phase shifter 343, and a PA 3322 is correspondingly connected to the phase shifter 344. The phase shifter may be located between the PA and the switching switch (as shown in FIG. 9), or may be located between the PA and the antenna array (as shown in FIG. 10). This is not limited in this embodiment of this application.

It should be understood that, when the downlink transmitting system 300 includes the phase shifters, because the phase shifters may adjust a phase of a beam, that is, may adjust a direction of the beam, even if the downlink transmitting system 300 is in the second connection state, the downlink transmitting system 300 may adjust coverage by using the phase shifters. Therefore, when the downlink transmitting system 300 includes the phase shifters, the baseband processor does not need to determine whether the users are distributed within the coverage of the downlink transmitting system in the second connection state. In other words, when determining that the second condition is met, the baseband processor may control the switching switch to enable the downlink transmitting system 300 to be in the second connection state.

Figure 11:
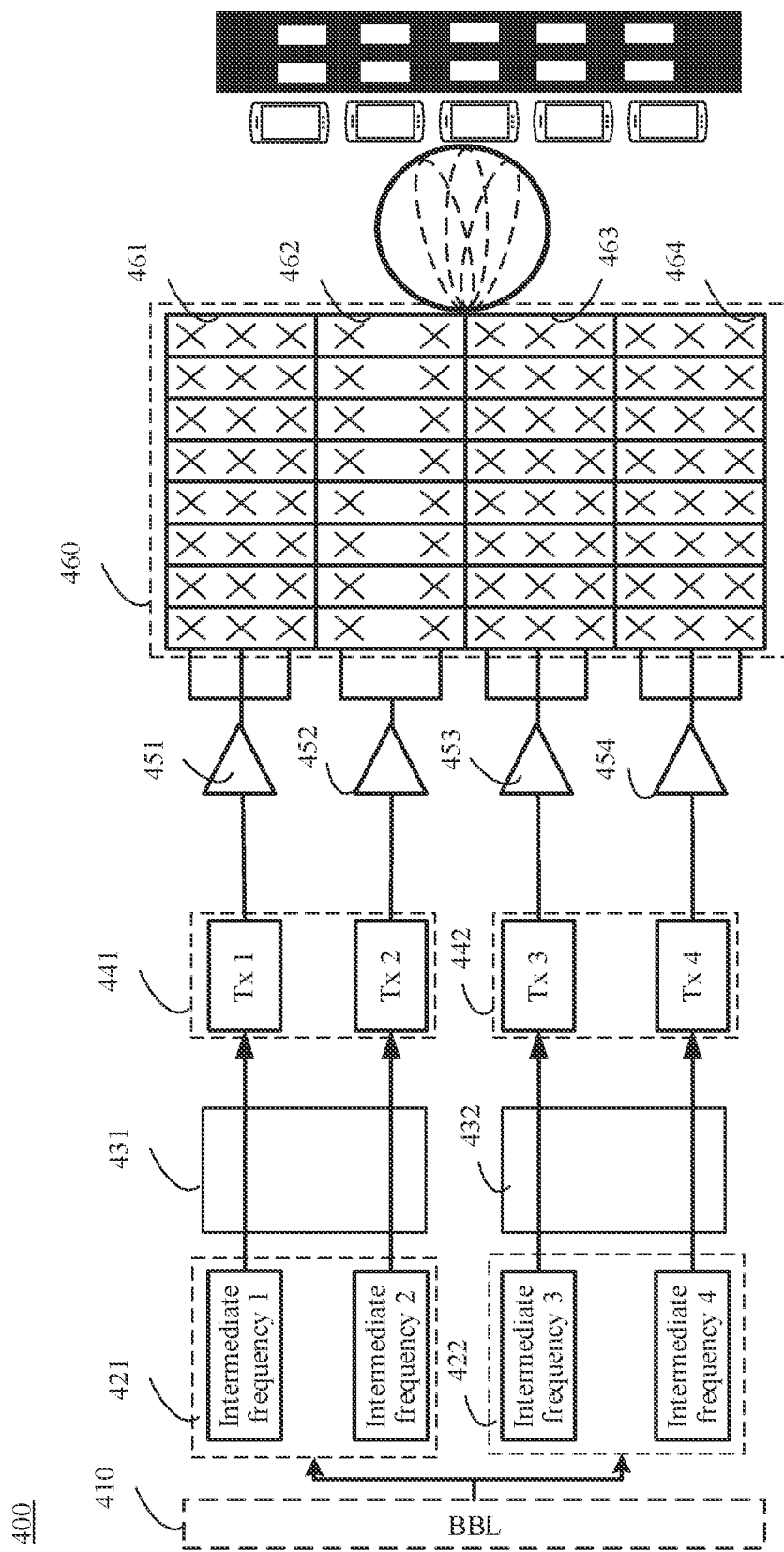

FIG. 11 is a schematic diagram of a structure of another downlink transmitting system 400 according to an embodiment of this application. The downlink transmitting system 400 may include: at least one Tx port group (for example, a Tx port group 441 and a Tx port group 442 in FIG. 11), at least one digital intermediate frequency module group (where a digital intermediate frequency module is denoted as an intermediate frequency below) (for example, an intermediate frequency group 421 and an intermediate frequency group 422 in FIG. 11), at least one switching switch (for example, a switching switch 431 and a switching switch 432 in FIG. 11), a plurality of PAs (for example, a PA 451 to a PA 454 in FIG. 11), and an antenna array 460.

The antenna array 460 may include a plurality of antenna bays (for example, an antenna bay 461 to an antenna bay 464 in FIG. 11). A quantity of rows of antenna elements included in each antenna bay is not limited in this embodiment of this application. For example, the antenna bay 461 includes three rows of antenna elements, and an antenna bay 462 includes two rows of antenna elements.

The plurality of PAs are connected to the antenna array 460, and each PA in the plurality of PAs is connected to one antenna bay in the antenna array 460. For example, in FIG. 11, the PA 451 is connected to the antenna bay 461, and a PA 452 is connected to the antenna bay 462. A PA 453 is connected to an antenna bay 463, and the PA 454 is connected to the antenna bay 464.

The plurality of PAs are connected to all Tx ports included in the at least one Tx port group in a one-to-one correspondence. For example, in FIG. 11, the PA 451 is connected to a Tx port 1, the PA 452 is connected to a Tx port 2, the PA 453 is connected to a Tx port 3, and the PA 454 is connected to a Tx port 4.

The at least one Tx port group is in a one-to-one correspondence with the at least one intermediate frequency group, and each Tx port group is connected to each intermediate frequency in a corresponding intermediate frequency group through one switching switch. For example, in FIG. 11, the Tx port group 441 corresponds to the intermediate frequency group 421, and the Tx port group 441 is connected to each intermediate frequency in the intermediate frequency group 421 through the switching switch 431. The Tx port group 442 corresponds to the intermediate frequency group 422, and the Tx port group 442 is connected to each intermediate frequency in the intermediate frequency group 422 through the switching switch 432.

Each of the at least one Tx port group includes a plurality of Tx ports, and a quantity of Tx ports included in each Tx port group is equal to a quantity of intermediate frequencies included in a corresponding intermediate frequency group.

For example, in FIG. 11, the Tx port group 441 and the Tx port group 442 each include 2 Tx ports, a quantity of Tx ports included in the Tx port group 441 and a quantity of intermediate frequencies included in the intermediate frequency group 421 are both 2, and a quantity of Tx ports included in the Tx port group 442 and a quantity of intermediate frequencies included in the intermediate frequency group 422 are both 2.

Figure 12:
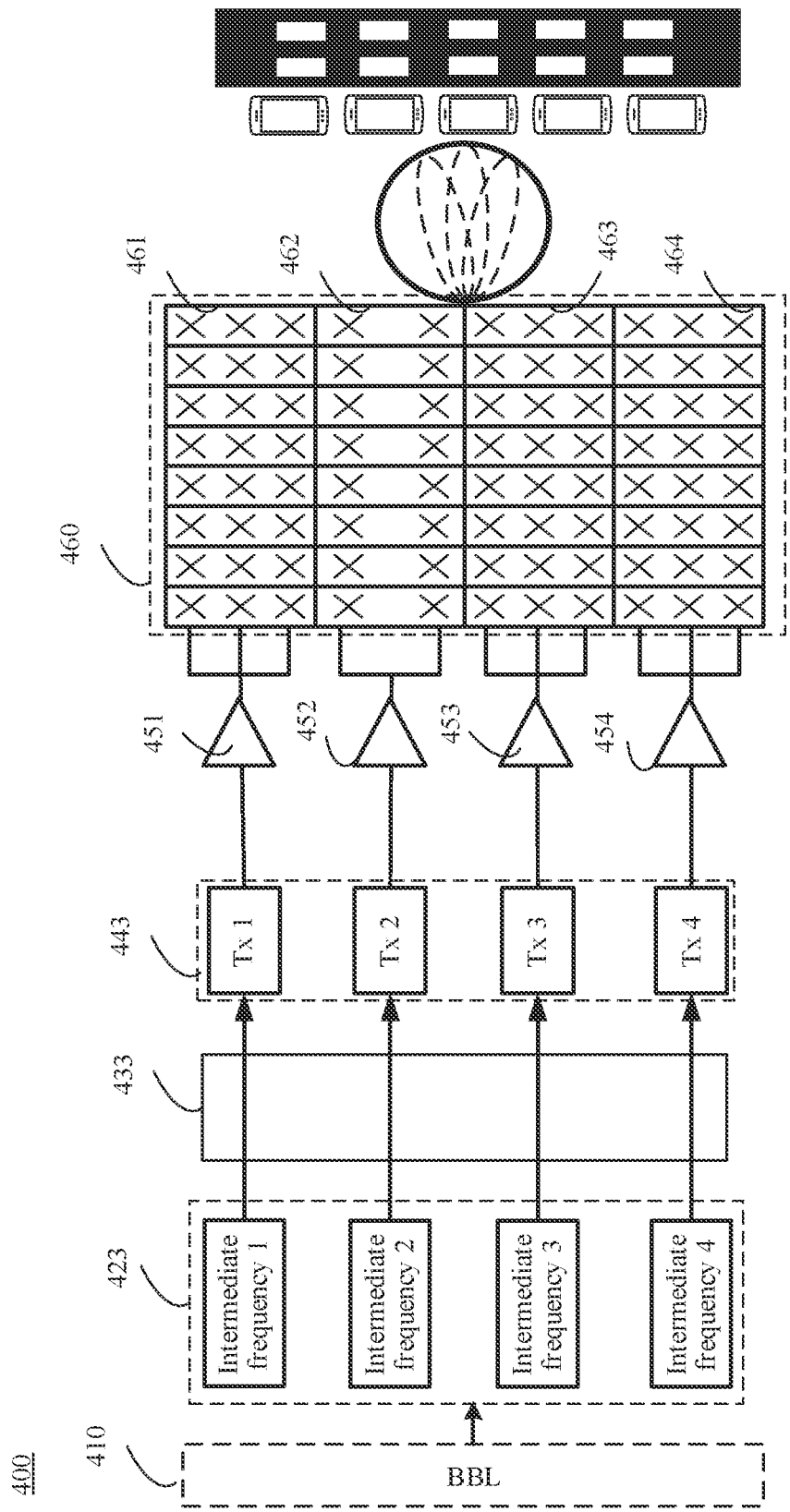

For another example, in FIG. 12, a quantity of Tx ports included in a Tx port group 443 is 4, and the quantity of Tx ports included in the Tx port group 443 and a quantity of intermediate frequencies included in an intermediate frequency group 423 are both 4.

Optionally, each of the at least one Tx port group may include a same quantity of Tx ports. For example, in FIG. 11, the quantity of Tx ports included in the Tx port group 441 and the quantity of Tx ports included in the Tx port group 442 are both 2.

Optionally, each of the at least one Tx port group may include a different quantity of Tx ports. For example, in FIG. 13, a quantity of Tx ports included in a Tx port group 441 is 2, but a quantity of Tx ports included in a Tx port group 443 is 4.

Each of the at least one switching switch includes at least two connection states, and quantities of enabled intermediate frequencies in an intermediate frequency group connected to the switching switch in different connection states are different. In other words, the downlink transmitting system 400 includes the at least two connection states.

The at least two connection states may include a first connection state and a second connection state, and a quantity of enabled intermediate frequencies in the first connection state is greater than a quantity of enabled intermediate frequencies in the second connection state.

When a connection state of a first switching switch is the first connection state, a plurality of Tx ports in a first Tx port group are connected to a plurality of intermediate frequencies in a first intermediate frequency group in a one-to-one correspondence, the first Tx port group and the first intermediate frequency group are connected through the first switching switch, and the first switching switch is any one of the at least one switching switch.

For example, in FIG. 11, the first switching switch may be the switching switch 431, the first Tx port group is the Tx port group 441, and the first intermediate frequency group is the intermediate frequency group 421. When a connection state of the switching switch 431 is the first connection state, two Tx ports in the Tx port group 441 are connected to two intermediate frequencies in the intermediate frequency group 421 in a one-to-one correspondence. To be specific, the Tx port 1 is correspondingly connected to an intermediate frequency 1, and the Tx port 2 is correspondingly connected to an intermediate frequency 2. Alternatively, the first switching switch may be the switching switch 432, the first Tx port group is the Tx port group 442, and the first intermediate frequency group is the intermediate frequency group 422. When a connection state of the switching switch 432 is the first connection state, two Tx ports in the Tx port group 442 are connected to two intermediate frequencies in the intermediate frequency group 422 in a one-to-one correspondence. To be specific, the Tx port 3 is correspondingly connected to an intermediate frequency 3, and the Tx port 4 is correspondingly connected to an intermediate frequency 4.

For example, in FIG. 12, the first switching switch may be a switching switch 433, the first Tx port group is the Tx port group 443, and the first intermediate frequency group is the intermediate frequency group 423. When a connection state of the switching switch 433 is the first connection state, four Tx ports in the Tx port group 443 are connected to four intermediate frequencies in the intermediate frequency group 423 in a one-to-one correspondence. To be specific, a Tx port 1 is correspondingly connected to an intermediate frequency 1, a Tx port 2 is correspondingly connected to an intermediate frequency 2, a Tx port 3 is correspondingly connected to an intermediate frequency 3, and a Tx port 4 is correspondingly connected to an intermediate frequency 4.

Figure 13:
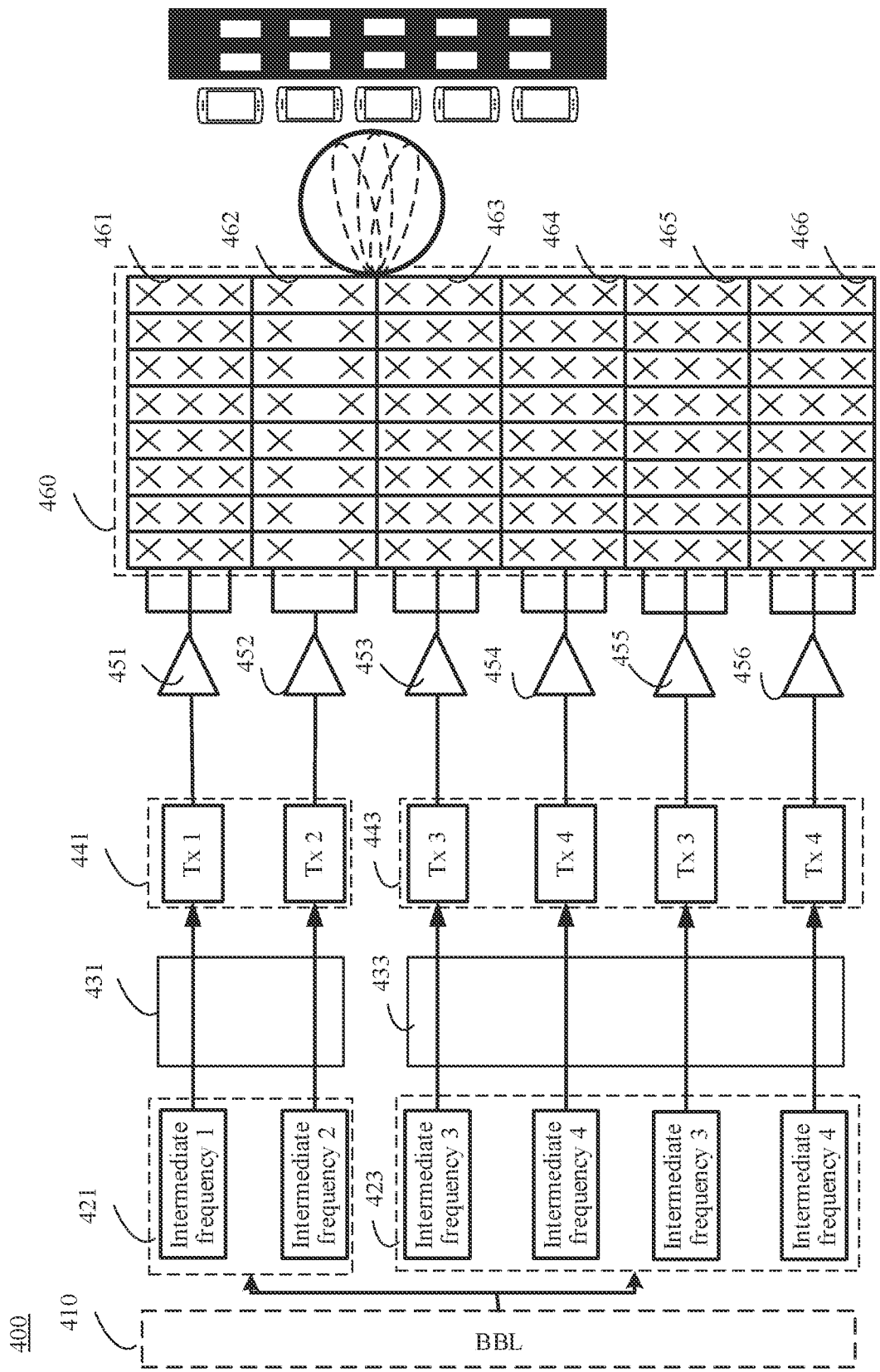

If connection states of all switching switches in the at least one switching switch are the first connection state, it may be considered that the downlink transmitting system 400 is in the first connection state. It can be learned that downlink transmitting systems 400 shown in FIG. 11 to FIG. 13 are in the first connection state.

When the connection state of the first switching switch is the second connection state, at least one first intermediate frequency in the first intermediate frequency group is connected to at least two Tx ports in the first Tx port group, and at least one second intermediate frequency in the first intermediate frequency group is not connected to all Tx ports in the first Tx port group. It may be understood that, when the second intermediate frequency is not connected to all the Tx ports in the first Tx port group, the second intermediate frequency is in a disabled state.

Figure 14:
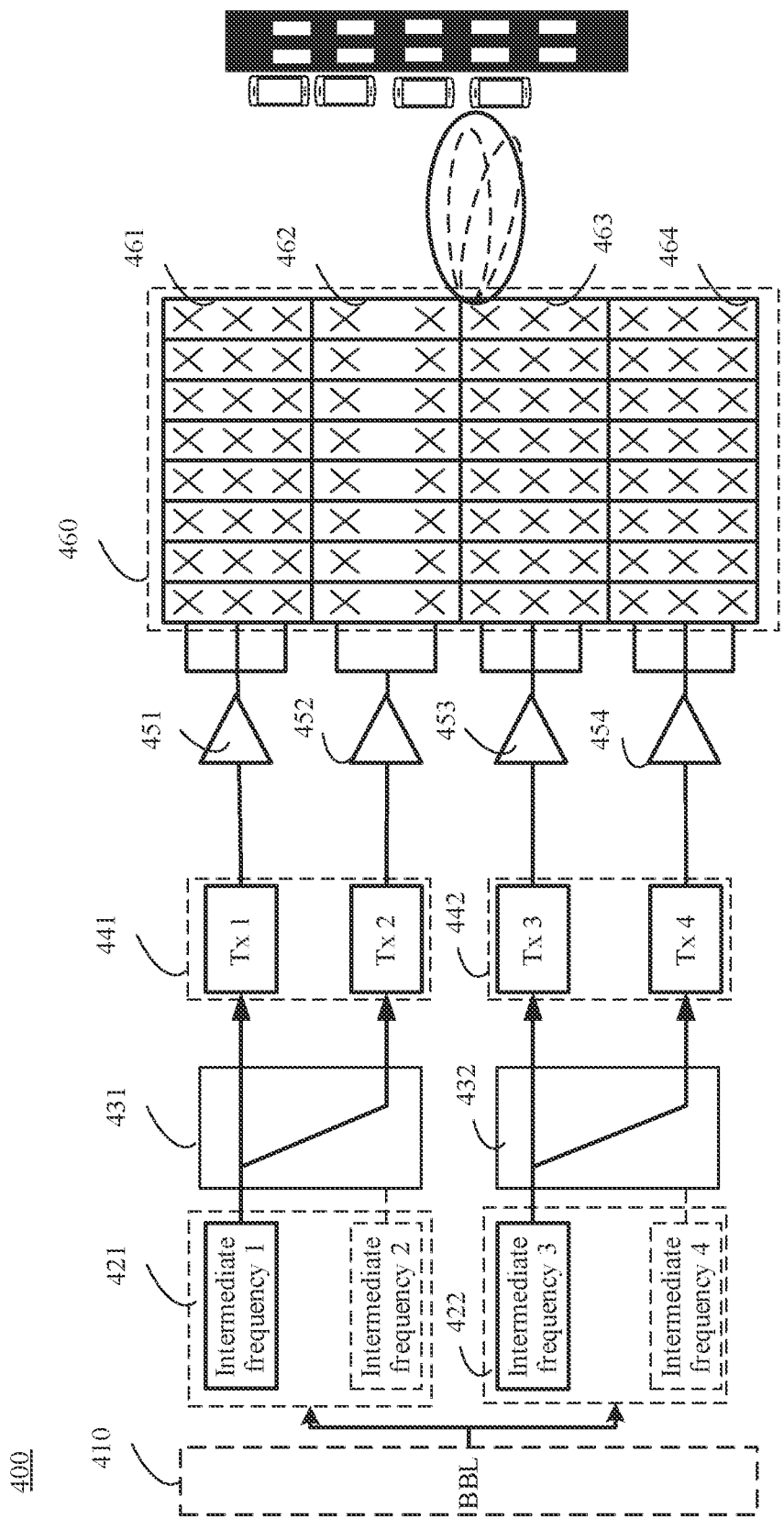

For example, in FIG. 14, the first switching switch may be a switching switch 431, the first Tx port group is a Tx port group 441, the first intermediate frequency group is an intermediate frequency group 421, the first intermediate frequency is an intermediate frequency 1, and the second intermediate frequency is an intermediate frequency 2. When a connection state of the switching switch 431 is the second connection state, the intermediate frequency 1 is connected to two Tx ports (namely, a Tx port 1 and a Tx port 2) in the Tx port group 441, and the intermediate frequency 2 is in a disabled state. Alternatively, the first switching switch may be a switching switch 432, the first Tx port group is a Tx port group 442, the first intermediate frequency group is an intermediate frequency group 422, the first intermediate frequency is an intermediate frequency 3, and the second intermediate frequency is an intermediate frequency 4. When a connection state of the switching switch 432 is the second connection state, the intermediate frequency 3 is connected to two Tx ports (namely, a Tx port 3 and a Tx port 4) in the Tx port group 442, and the intermediate frequency 4 is in a disabled state.

Figure 15:
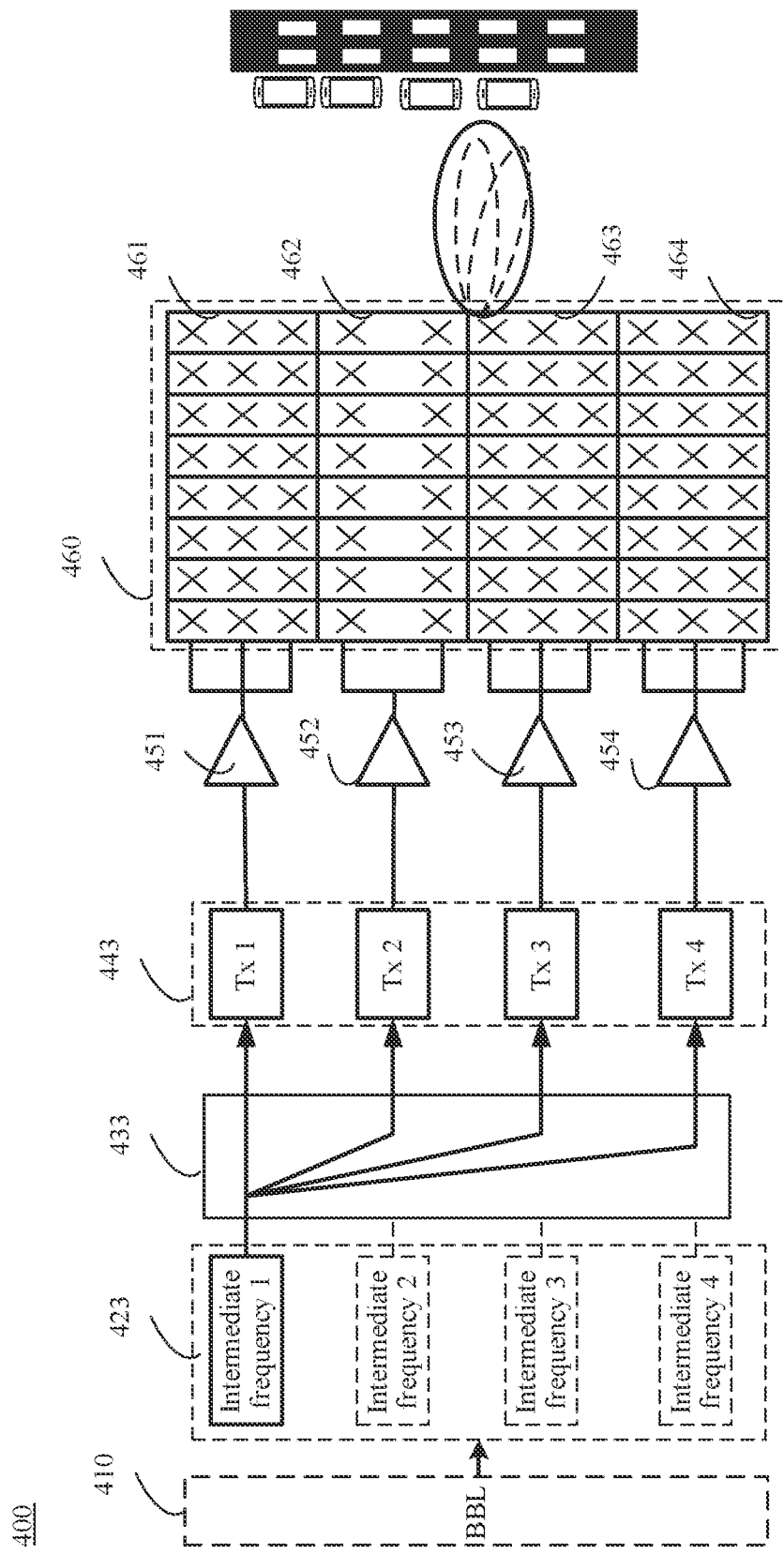

For example, in FIG. 15, the first switching switch may be a switching switch 433, the first Tx port group is a Tx port group 443, the first intermediate frequency group is an intermediate frequency group 423, the first intermediate frequency is an intermediate frequency 1, and the second intermediate frequency is an intermediate frequency 2 to an intermediate frequency 4. When a connection state of the switching switch 433 is the second connection state, the intermediate frequency 1 is connected to four Tx ports (namely, a Tx port 1 to a Tx port 4) in the Tx port group 443, and the intermediate frequency 2 to the intermediate frequency 4 are in a disabled state.

Figure 16:
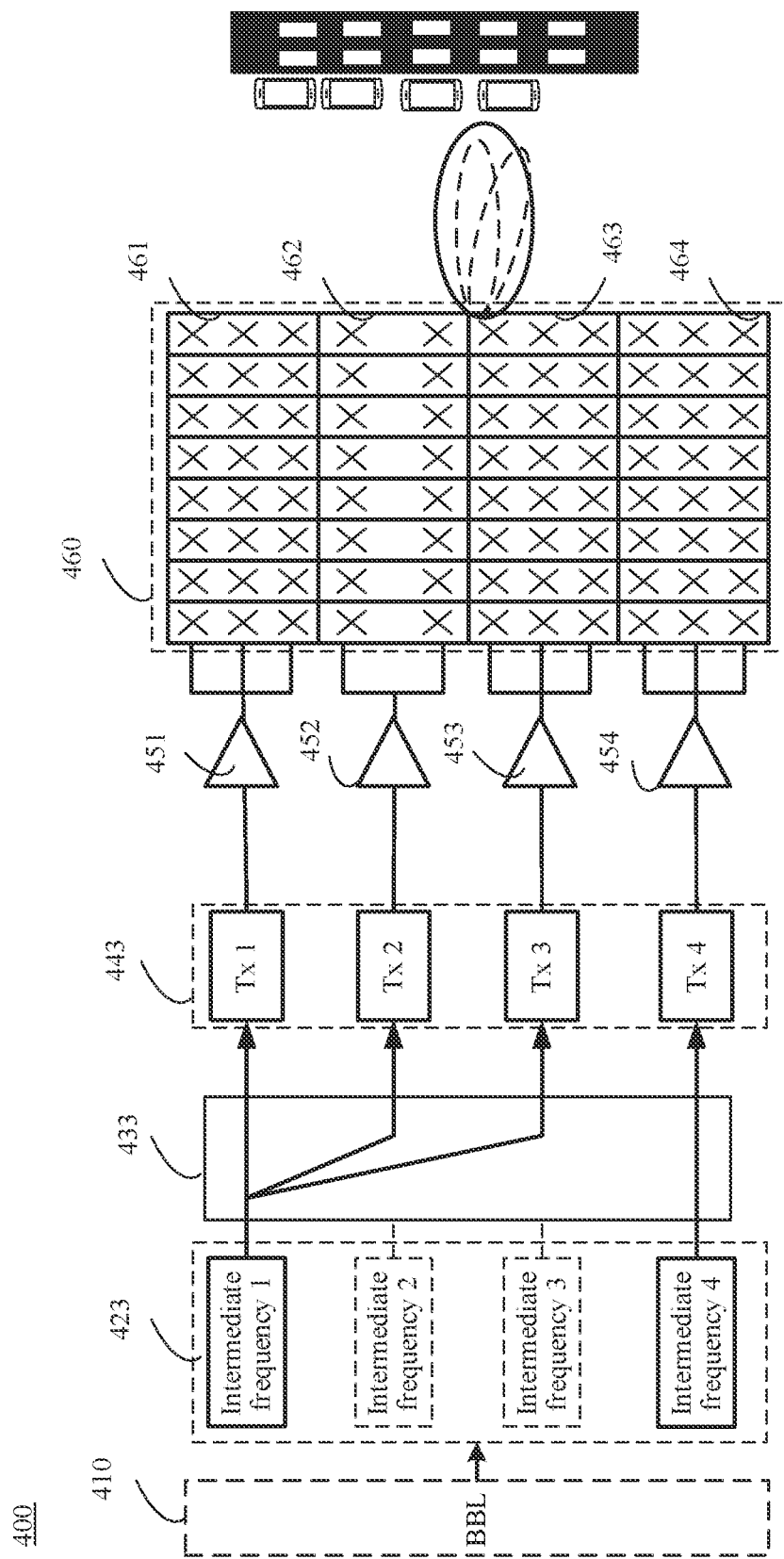

For example, in FIG. 16, the first switching switch may be a switching switch 433, the first Tx port group is a Tx port group 443, the first intermediate frequency group is an intermediate frequency group 423, the first intermediate frequency is an intermediate frequency 1, and the second intermediate frequency is an intermediate frequency 2 and an intermediate frequency 3. When a connection state of the switching switch 433 is the second connection state, the intermediate frequency 1 is connected to three Tx ports (namely, a Tx port 1 to a Tx port 3) in the Tx port group 443, the intermediate frequency 2 and the intermediate frequency 3 are in a disabled state, and a Tx port 4 may still be connected to an intermediate frequency 4.

If a connection state of at least one of the at least one switching switch is the second connection state, it may be considered that the downlink transmitting system 400 is in the second connection state. It can be learned that downlink transmitting systems 400 shown in FIG. 14 to FIG. 16 are in the second connection state.

As shown in FIG. 11 to FIG. 16, the downlink transmitting system 400 may further include a baseband processor 410 (for example, may be a BBL), and a connection state of each of the at least one switching switch may be controlled by the baseband processor. For example, the baseband processor may control the connection state of the switching switch based on a quantity of users served by the downlink transmitting system 400 and a vertical spacing between different users relative to a ground.

For example, when a first condition is met, the baseband processor controls the connection state of the at least one of the at least one switching switch to be the first connection state, where the first condition includes at least one of the following conditions:

The quantity of users served by the downlink transmitting system 400 is greater than or equal to a first threshold; and
   a vertical spacing between at least two of the users served by the downlink transmitting system 400 relative to the ground is greater than or equal to a second threshold.

For another example, when a second condition is met, the baseband processor controls the connection state of the at least one of the at least one switching switch to be the second connection state, where the second condition is as follows:

The quantity of users served by the downlink transmitting system 400 is less than a first threshold, and a vertical spacing between any two of the users served by the downlink transmitting system 400 relative to the ground is less than a second threshold.

Optionally, when the second condition is met, the baseband processor is further configured to determine whether the users are distributed within coverage of the downlink transmitting system in the second connection state. If the users are distributed within the coverage of the downlink transmitting system in the second connection state, the baseband processor controls the connection state of the at least one of the at least one switching switch to be the second connection state. Alternatively, if the users are distributed outside the coverage of the downlink transmitting system in the second connection state, the baseband processor controls the connection state of the at least one of the at least one switching switch to be the first connection state.

For example, with reference to the downlink transmitting systems 400 shown in FIG. 11 and FIG. 14 (where a quantity of Tx ports included in each Tx port group and a quantity of intermediate frequencies included in each intermediate frequency group are both 2), if the downlink transmitting system 400 includes 64 Tx ports, the downlink transmitting system 400 in the first connection state may be referred to as 64 DBF. If a connection state of each switching switch in the downlink transmitting system 400 is the second connection state, a quantity of enabled intermediate frequencies is 32, and the downlink transmitting system 400 in the second connection state may be referred to as 32 DBF. Therefore, when the second condition is met, the baseband processor is further configured to determine whether the users are distributed within coverage of the 32 DBF. If the users (for example, $3^{rd}$ and $4^{th}$ users counted from top to bottom in FIG. 14) are distributed within the coverage of the 32 DBF, the baseband processor controls the switching switch to enable the downlink transmitting system 400 to be in the second connection state. If the users (for example, $1^{st}$ and $2^{nd}$ users counted from top to bottom in FIG. 14) are not distributed within the coverage of the 32 DBF, the baseband processor controls the switching switch to enable the downlink transmitting system 400 to be in the first connection state.

A method for determining, by the baseband processor, the quantity of users served by the downlink transmitting system 400 and the vertical spacing between the different users relative to the ground is not limited in this embodiment of this application. For example, the baseband processor may determine the quantity of users and the vertical spacing between the different users relative to the ground based on a received CSI beam ID.

It should be understood that FIG. 11 to FIG. 16 are merely examples, and show four or six Tx ports, four or six intermediate frequencies, four or six PAs, and one or two switching switches. Optionally, the downlink transmitting system 400 may include K Tx ports, K intermediate frequencies, K PAs, and L switching switches, where K is an integer greater than 1, and L is a positive integer.

Figure 17:
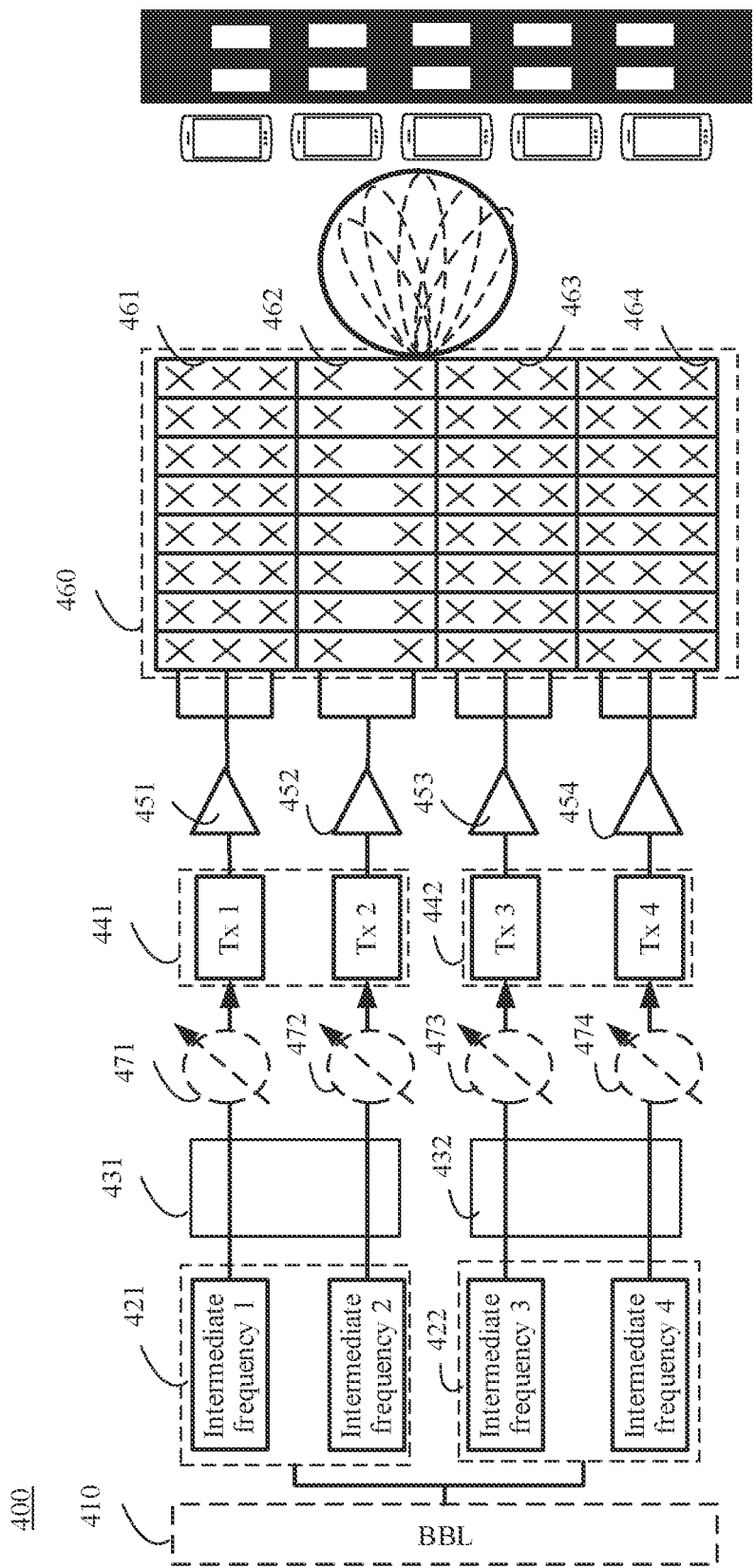

Optionally, as shown in FIG. 17, the downlink transmitting system 400 may further include a plurality of phase shifters (for example, a phase shifter 471 to a phase shifter 474 in FIG. 17). The plurality of phase shifters are connected to a plurality of Tx ports in a one-to-one correspondence. For example, in FIG. 17, a Tx port 1 is correspondingly connected to the phase shifter 471, a Tx port 2 is correspondingly connected to a phase shifter 472, a Tx port 3 is correspondingly connected to a phase shifter 473, and a Tx port 4 is correspondingly connected to the phase shifter 474.

It should be understood that, when the downlink transmitting system 400 includes the phase shifters, because the phase shifters may adjust a phase of a beam, that is, may adjust a direction of the beam, even if the downlink transmitting system 400 is in the second connection state, the downlink transmitting system 400 may adjust coverage by using the phase shifters. Therefore, when the downlink transmitting system 400 includes the phase shifters, the baseband processor does not need to determine whether the users are distributed within the coverage of the downlink transmitting system in the second connection state. In other words, when determining that the second condition is met, the baseband processor may control the switching switch to enable the downlink transmitting system 400 to be in the second connection state.

Figure 18:
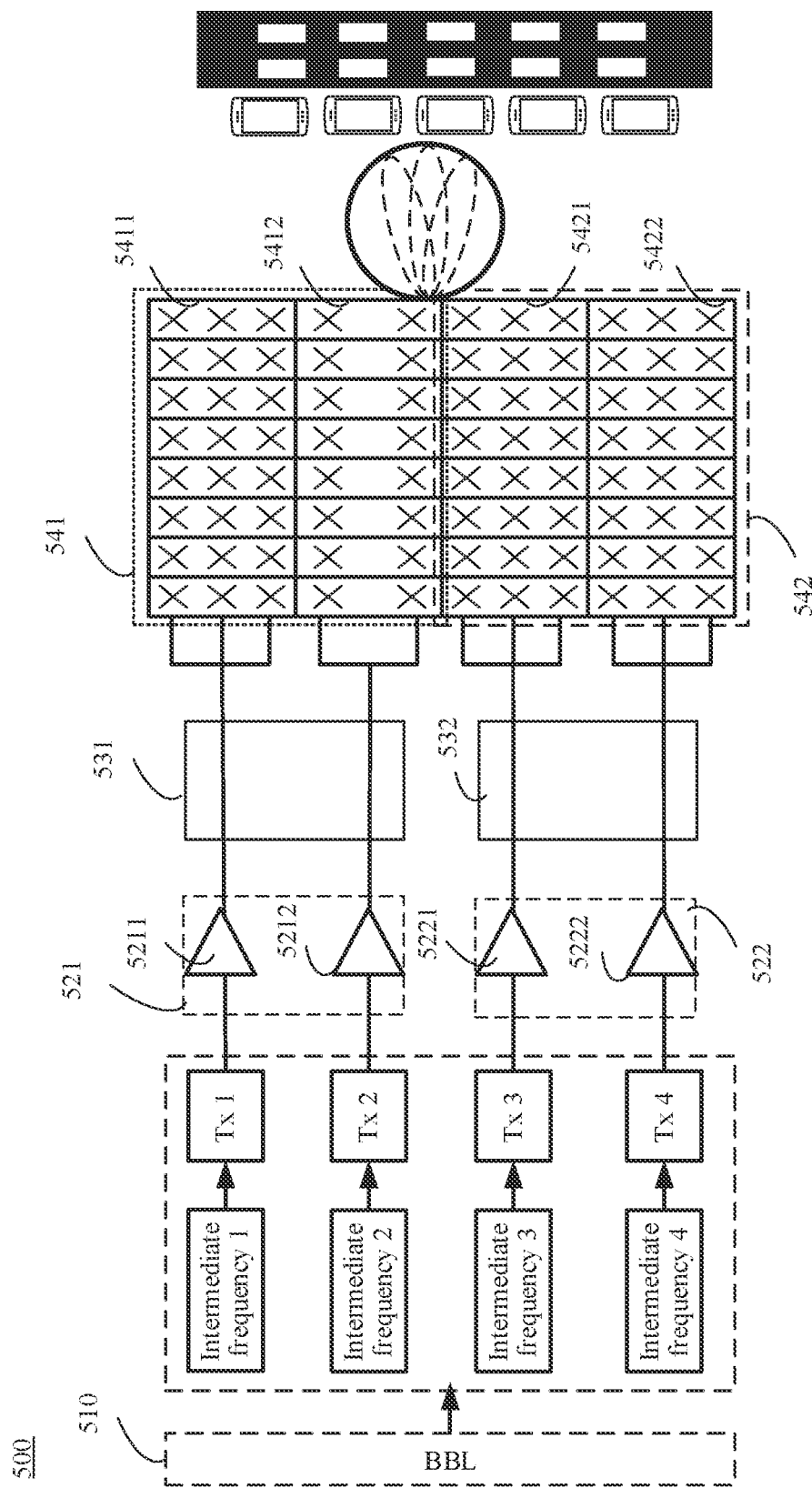

FIG. 18 is a schematic diagram of a structure of another downlink transmitting system 500 according to an embodiment of this application. The downlink transmitting system 500 may include: a plurality of Tx channels, at least one PA group (for example, a PA group 521 and a PA group 522 in FIG. 18), at least one antenna bay group (for example, an antenna bay group 541 and an antenna bay group 542 in FIG. 18), and at least one switching switch (for example, a switching switch 531 and a switching switch 532 in FIG. 18).

Each Tx channel may include an intermediate frequency and a Tx port. For example, in FIG. 18, a $1^{st}$ Tx channel may include an intermediate frequency 1 and a Tx port 1, a $2^{nd}$ Tx channel may include an intermediate frequency 2 and a Tx port 2, a $3^{rd}$ Tx channel may include an intermediate frequency 3 and a Tx port 3, and a $4^{th}$ Tx channel may include an intermediate frequency 4 and a Tx port 4.

The at least one PA group is in a one-to-one correspondence with the at least one antenna bay group, and each PA group is connected to each antenna bay in a corresponding antenna bay group through one switching switch. For example, in FIG. 18, the PA group 521 corresponds to the antenna bay group 541, and the PA group 521 is connected to each antenna bay in the antenna bay group 541 through the switching switch 531. The PA group 522 corresponds to the antenna bay group 542, and the PA group 522 is connected to each antenna bay in the antenna bay group 542 through the switching switch 532.

Each of the at least one PA group includes a plurality of PAs, and a quantity of PAs included in each PA group is equal to a quantity of antenna bays included in a corresponding antenna bay group.

For example, in FIG. 18, the PA group 521 and the PA group 522 each include two PAs, a quantity of PAs included in the PA group 521 and a quantity of antenna bays included in the antenna bay group 541 are both 2, and a quantity of PAs included in the PA group 522 and a quantity of antenna bays included in the antenna bay group 542 are both 2.

Figure 19:
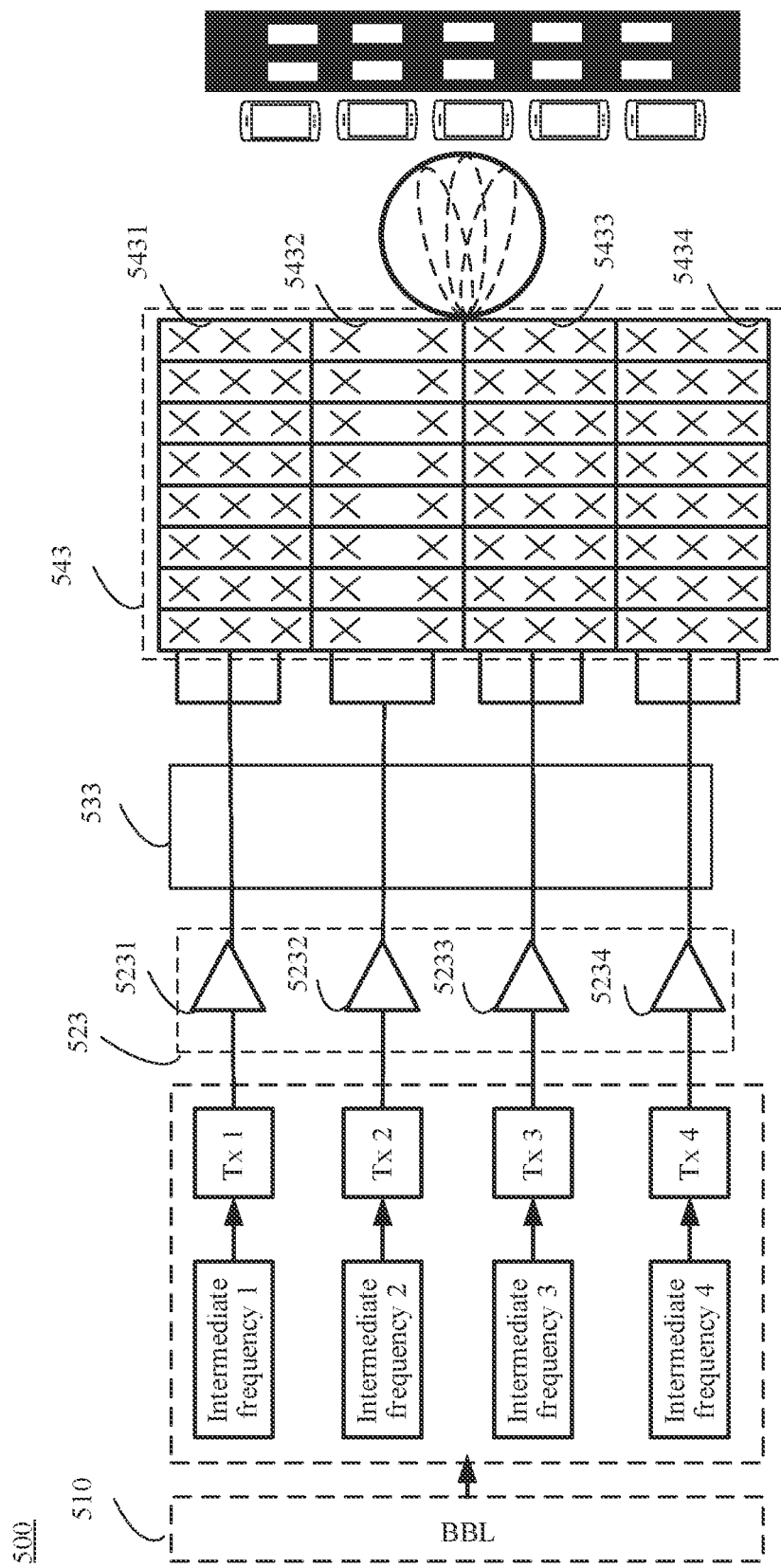

For another example, in FIG. 19, a quantity of PAs included in a PA group 523 is 4, and the quantity of PAs included in the PA group 523 and a quantity of antenna bays included in an antenna bay group 543 are both 4.

Optionally, each of the at least one PA group may include a same quantity of PAs. For example, in FIG. 18, the quantity of PAs included in the PA group 521 and the quantity of PAs included in the PA group 522 are both 2.

Optionally, each of the at least one PA group may include a different quantity of PAs. For example, in FIG. 20, a quantity of PAs included in a PA group 521 is 2, but a quantity of PAs included in a PA group 523 is 4.

A quantity of rows of antenna elements included in each antenna bay is not limited in this embodiment of this application. For example, in FIG. 18, an antenna bay 5411 includes three rows of antenna elements, and an antenna bay 5412 includes two rows of antenna elements.

Each of the at least one switching switch includes at least two connection states, and quantities of enabled PAs in a PA group connected to the switching switch in different connection states are different. In other words, the downlink transmitting system 500 includes the at least two connection states. It may be understood that, in the downlink transmitting system 500, a plurality of Tx channels are connected to a plurality of PAs in a one-to-one correspondence. Therefore, in the different connection states, quantities of enabled Tx channels in the downlink transmitting system 500 are different.

The at least two connection states may include a first connection state and a second connection state, and a quantity of enabled PAs in the first connection state is greater than a quantity of enabled PAs in the second connection state. In other words, a quantity of enabled Tx channels in the first connection state is greater than a quantity of enabled Tx channels in the second connection state.

When a connection state of a first switching switch is the first connection state, a plurality of PAs in a first PA group are connected to a plurality of antenna bays in a first antenna bay group in a one-to-one correspondence, the first PA group and the first antenna bay group are connected through the first switching switch, and the first switching switch is any one of the at least one switching switch.

For example, in FIG. 18, the first switching switch may be the switching switch 531, the first PA group is the PA group 521, and the first antenna bay group is the antenna bay group 541. When a connection state of the switching switch 531 is the first connection state, two PAs in the PA group 521 are connected to two antenna bays in the antenna bay group 541 in a one-to-one correspondence. To be specific, a PA 5211 is correspondingly connected to the antenna bay 5411, and a PA 5212 is correspondingly connected to the antenna bay 5412. Alternatively, the first switching switch may be the switching switch 532, the first PA group is the PA group 522, and the first antenna bay group is the antenna bay group 542. When a connection state of the switching switch 532 is the first connection state, two PAs in the PA group 522 are connected to two antenna bays in the antenna bay group 542 in a one-to-one correspondence. To be specific, a PA 5221 is correspondingly connected to an antenna bay 5421, and a PA 5222 is correspondingly connected to an antenna bay 5422.

For example, in FIG. 19, the first switching switch may be a switching switch 533, the first PA group is the PA group 523, and the first antenna bay group is the antenna bay group 543. When a connection state of the switching switch 533 is the first connection state, four PAs in the PA group 523 are connected to four antenna bays in the antenna bay group 543 in a one-to-one correspondence. To be specific, a PA 5231 is correspondingly connected to an antenna bay 5431, a PA 5232 is correspondingly connected to an antenna bay 5432, a PA 5233 is correspondingly connected to an antenna bay 5433, and a PA 5234 is correspondingly connected to an antenna bay 5434.

Figure 20:
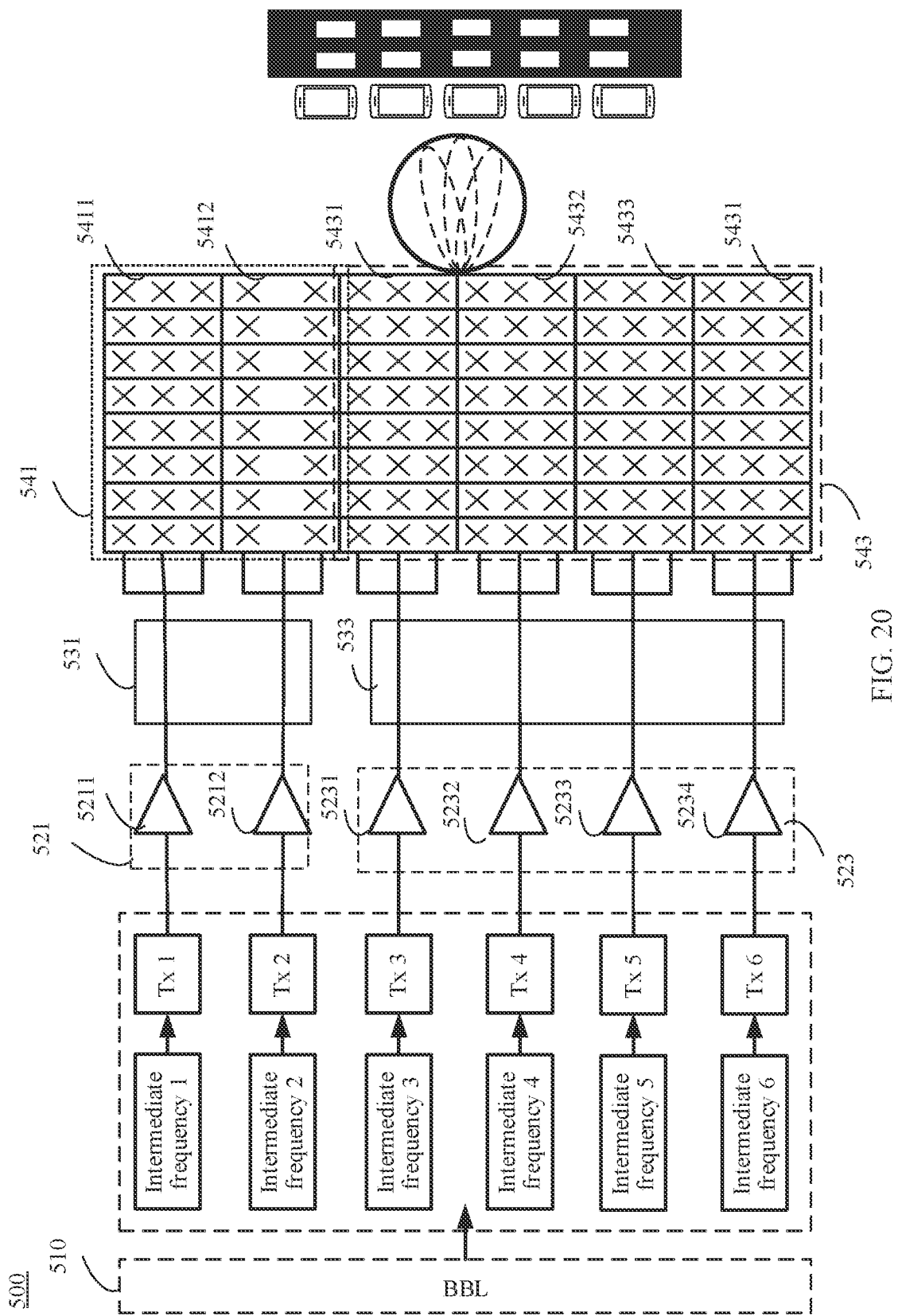

If connection states of all switching switches in the at least one switching switch are the first connection state, it may be considered that the downlink transmitting system 500 is in the first connection state. It can be learned that downlink transmitting systems 500 shown in FIG. 18 to FIG. 20 are in the first connection state.

When the connection state of the first switching switch is the second connection state, at least one first PA in the first PA group is connected to at least two antenna bays in the first antenna bay group, and at least one second PA in the first PA group is not connected to all antenna bays in the first antenna bay group. It may be understood that, when the second PA is not connected to all the antenna bays in the first antenna bay group, the second PA is in a disabled state. It may be understood that, when the second PA is in the disabled state, a Tx channel connected to the second PA is also in a disabled state.

Figure 21:
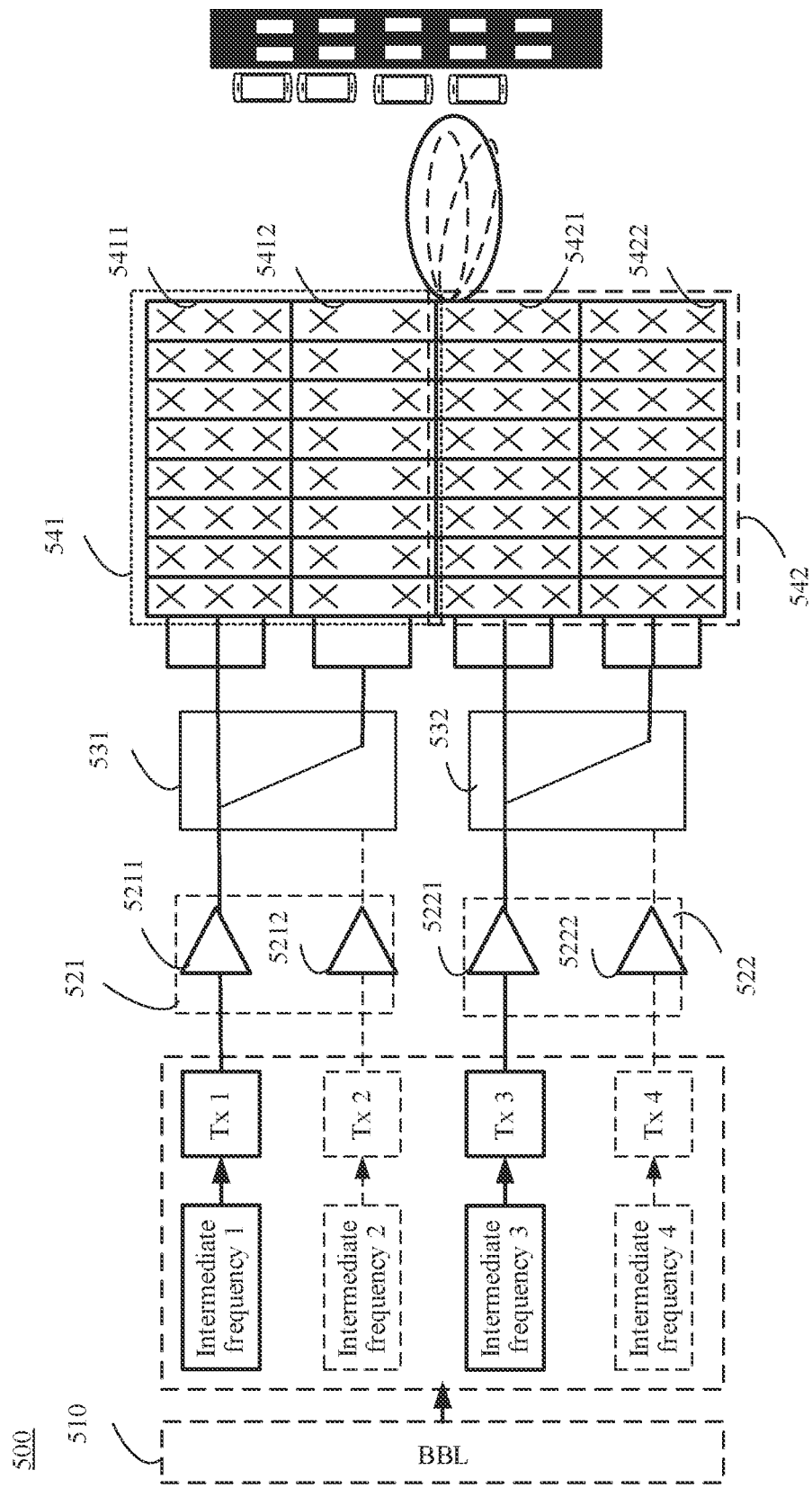

For example, in FIG. 21, the first switching switch may be a switching switch 531, the first PA group is a PA group 521, the first antenna bay group is an antenna bay group 541, the first PA is a PA 5211, and the second PA is a PA 5212. When a connection state of the switching switch 531 is the second connection state, the PA 5211 is connected to two antenna bays (namely, an antenna bay 5411 and an antenna bay 5422) in the antenna bay group 541, the PA 5212 is in a disabled state, and correspondingly, a second Tx channel connected to the PA 5212 is also in a disabled state. Alternatively, the first switching switch may be a switching switch 532, the first PA group is a PA group 522, the first antenna bay group is an antenna bay group 542, the first PA is a PA 5221, and the second PA is a PA 5222. When a connection state of the switching switch 532 is the second connection state, the PA 5221 is connected to two antenna bays (namely, an antenna bay 5421 and an antenna bay 5422) in the antenna bay group 542, the PA 5222 is in a disabled state, and a fourth Tx channel connected to the PA 5222 is also in a disabled state correspondingly.

Figure 22:
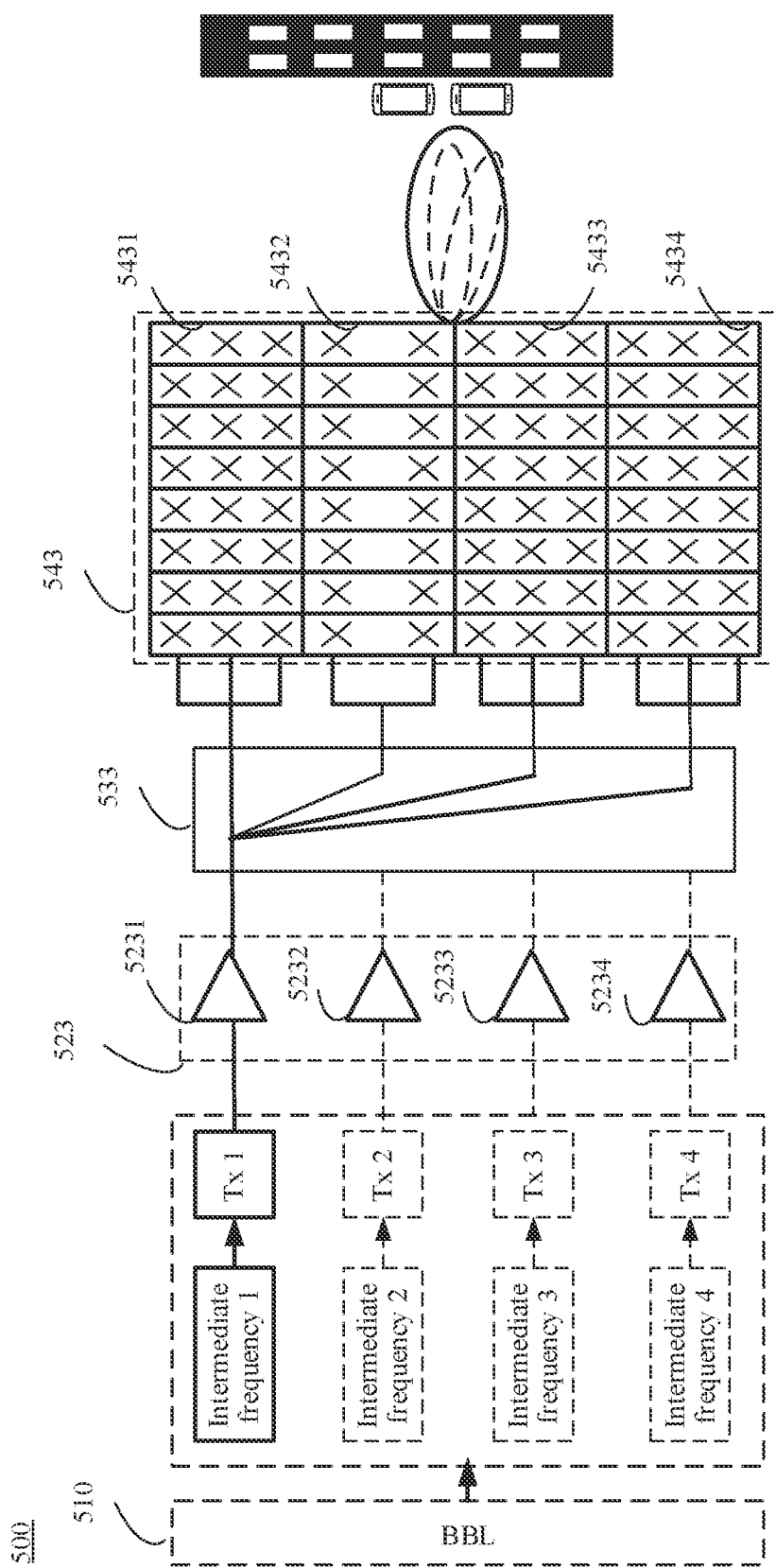

For example, in FIG. 22, the first switching switch may be a switching switch 533, the first antenna bay group is an antenna bay group 543, the first PA group is a PA group 523, the first PA is a PA 5231, and the second PA is a PA 5232 to a PA 5234. When a connection state of the switching switch 533 is the second connection state, the PA 5231 is connected to four antenna bays (namely, an antenna bay 5431 to an antenna bay 5434) in the antenna bay group 543, the PA 5232 to the PA 5234 are in a disabled state, and, a second Tx channel to a fourth Tx channel that are respectively connected to the PA 5232 to the PA 5234 are also in a disabled state correspondingly.

Figure 23:
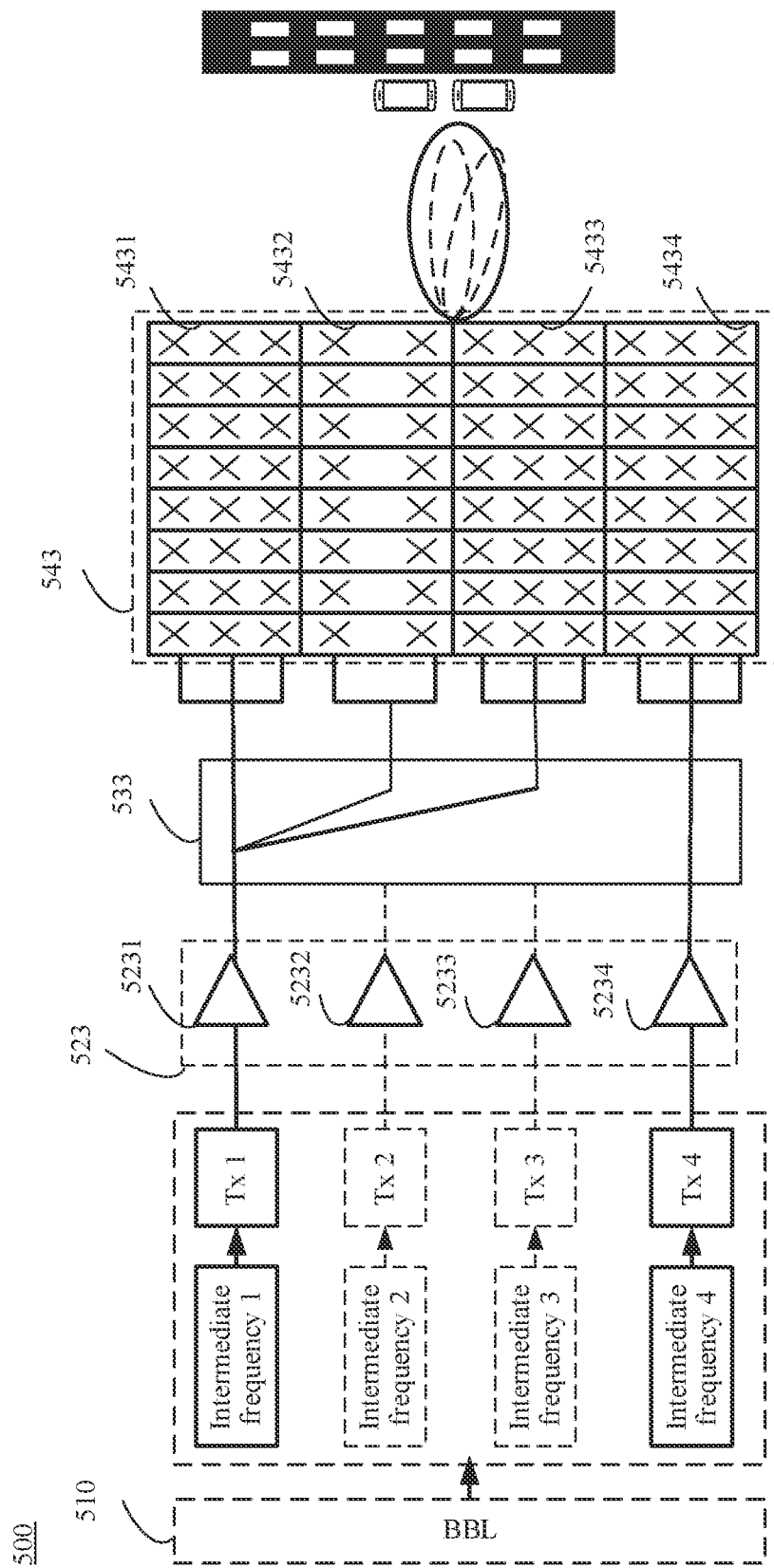

For example, in FIG. 23, the first switching switch may be a switching switch 533, the first antenna bay group is an antenna bay group 543, the first PA group is a PA group 523, the first PA is a PA 5231, and the second PA is a PA 5232 and a PA 5233. When a connection state of the switching switch 533 is the second connection state, the PA 5231 is connected to three antenna bays (namely, an antenna bay 5431 to an antenna bay 5433) in the antenna bay group 543, the PA 5232 and the PA 5233 are in a disabled state, a second Tx channel and a third Tx channel that are respectively connected to the PA 5232 and the PA 5233 are also in a disabled state correspondingly, and a PA 5234 may still be connected to an antenna bay 5434.

If a connection state of at least one of the at least one switching switch is the second connection state, it may be considered that the downlink transmitting system 500 is in the second connection state. It can be learned that downlink transmitting systems 500 shown in FIG. 21 to FIG. 23 are in the second connection state.

As shown in FIG. 18 to FIG. 23, the downlink transmitting system 500 may further include a baseband processor 510 (for example, may be a BBL), and a connection state of each of the at least one switching switch may be controlled by the baseband processor. For example, the baseband processor may control the connection state of the switching switch based on a quantity of users served by the downlink transmitting system 500 and a vertical spacing between different users relative to a ground.

For example, when a first condition is met, the baseband processor controls the connection state of the at least one of the at least one switching switch to be the first connection state, where the first condition includes at least one of the following conditions:

The quantity of users served by the downlink transmitting system 500 is greater than or equal to a first threshold; and a vertical spacing between at least two of the users served by the downlink transmitting system 500 relative to the ground is greater than or equal to a second threshold.

For another example, when a second condition is met, the baseband processor controls the connection state of the at least one of the at least one switching switch to be the second connection state, where the second condition is as follows:

The quantity of users served by the downlink transmitting system 500 is less than a first threshold, and a vertical spacing between any two of the users served by the downlink transmitting system 500 relative to the ground is less than a second threshold.

Optionally, when the second condition is met, the baseband processor is further configured to determine whether the users are distributed within coverage of the downlink transmitting system in the second connection state. If the users are distributed within the coverage of the downlink transmitting system in the second connection state, the baseband processor controls the connection state of the at least one of the at least one switching switch to be the second connection state. Alternatively, if the users are distributed outside the coverage of the downlink transmitting system in the second connection state, the baseband processor controls the connection state of the at least one of the at least one switching switch to be the first connection state.

For example, with reference to the downlink transmitting system 500 shown in FIG. 18 and FIG. 21 (where a quantity of PAs included in each PA group and a quantity of antenna bays included in each antenna bay group are both 2), if the downlink transmitting system 500 includes 64 PAs (in other words, includes 64 Tx channels), the downlink transmitting system 500 in the first connection state may be referred to as 64 DBF. If a connection state of each switching switch in the downlink transmitting system 500 is the second connection state, a quantity of enabled PAs is 32 (in other words, a quantity of enabled Tx channels is 32), and the downlink transmitting system 500 in the second connection state may be referred to as 32 DBF. Therefore, when the second condition is met, the baseband processor is further configured to determine whether the users are distributed within coverage of the 32 DBF. If the users (for example, $3^{rd}$ and $4^{th}$ users counted from top to bottom in FIG. 21) are distributed within the coverage of the 32 DBF, the baseband processor controls the switching switch to enable the downlink transmitting system 500 to be in the second connection state. If the users (for example, $1^{st}$ and $2^{nd}$ users counted from top to bottom in FIG. 21) are not distributed within the coverage of the 32 DBF, the baseband processor controls the switching switch to enable the downlink transmitting system 500 to be in the first connection state.

A method for determining, by the baseband processor, the quantity of users served by the downlink transmitting system 500 and the vertical spacing between the different users relative to the ground is not limited in this embodiment of this application. For example, the baseband processor may determine the quantity of users and the vertical spacing between the different users relative to the ground based on a received CSI beam ID.

It should be understood that FIG. 18 to FIG. 23 are merely examples, and show four or six antenna bays, four or six PAs, and one or two switching switches. Optionally, the downlink transmitting system 500 may include K antenna bays, K PAs, and L switching switches, where K is an integer greater than 1, and L is a positive integer.

Figure 24:
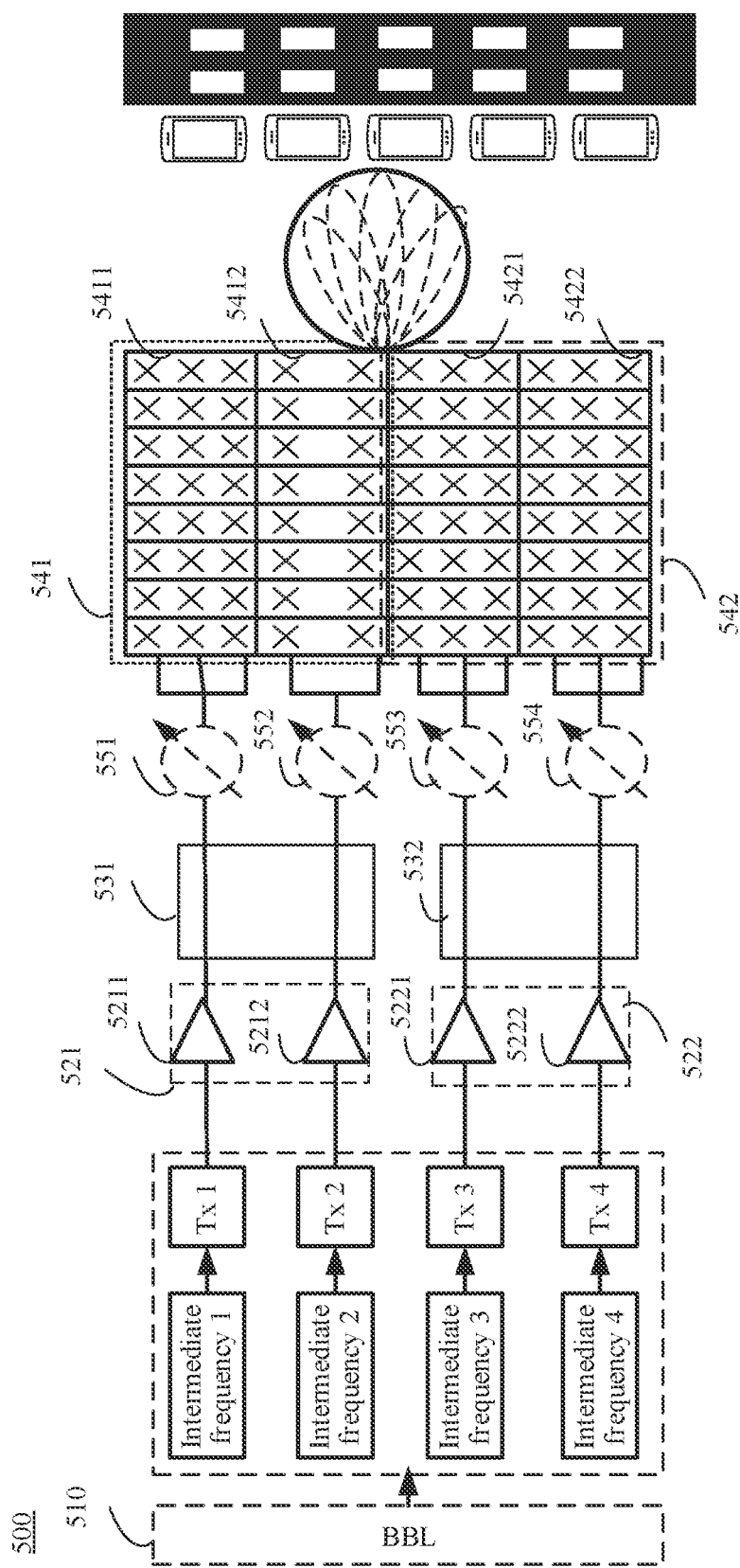

Optionally, as shown in FIG. 24, the downlink transmitting system 500 may further include a plurality of phase shifters (for example, a phase shifter 551 to a phase shifter 554 in FIG. 24). The plurality of phase shifters are connected to a plurality of antenna bays in a one-to-one correspondence. For example, in FIG. 24, an antenna bay 5411 is correspondingly connected to the phase shifter 551, an antenna bay 5412 is correspondingly connected to a phase shifter 552, an antenna bay 5421 is correspondingly connected to a phase shifter 553, and an antenna bay 5422 is correspondingly connected to the phase shifter 554.

It should be understood that, when the downlink transmitting system 500 includes the phase shifters, because the phase shifters may adjust a phase of a beam, that is, may adjust a direction of the beam, even if the downlink transmitting system 500 is in the second connection state, the downlink transmitting system 500 may adjust coverage by using the phase shifters. Therefore, when the downlink transmitting system 500 includes the phase shifters, the baseband processor does not need to determine whether the users are distributed within the coverage of the downlink transmitting system in the second connection state. In other words, when determining that the second condition is met, the baseband processor may control the switching switch to enable the downlink transmitting system 500 to be in the second connection state.

A structure and a type of a switching switch are not limited in embodiments of this application. In the following embodiment, a downlink transmitting system 300 is used as an example to describe the structure and the type of the switching switch provided in embodiments of this application. In the following embodiments, an example in which each Tx channel group includes two Tx channels and each PA group includes two PAs is used for description.

In an implementation, the switching switch may be a bridge.

Figure 25:
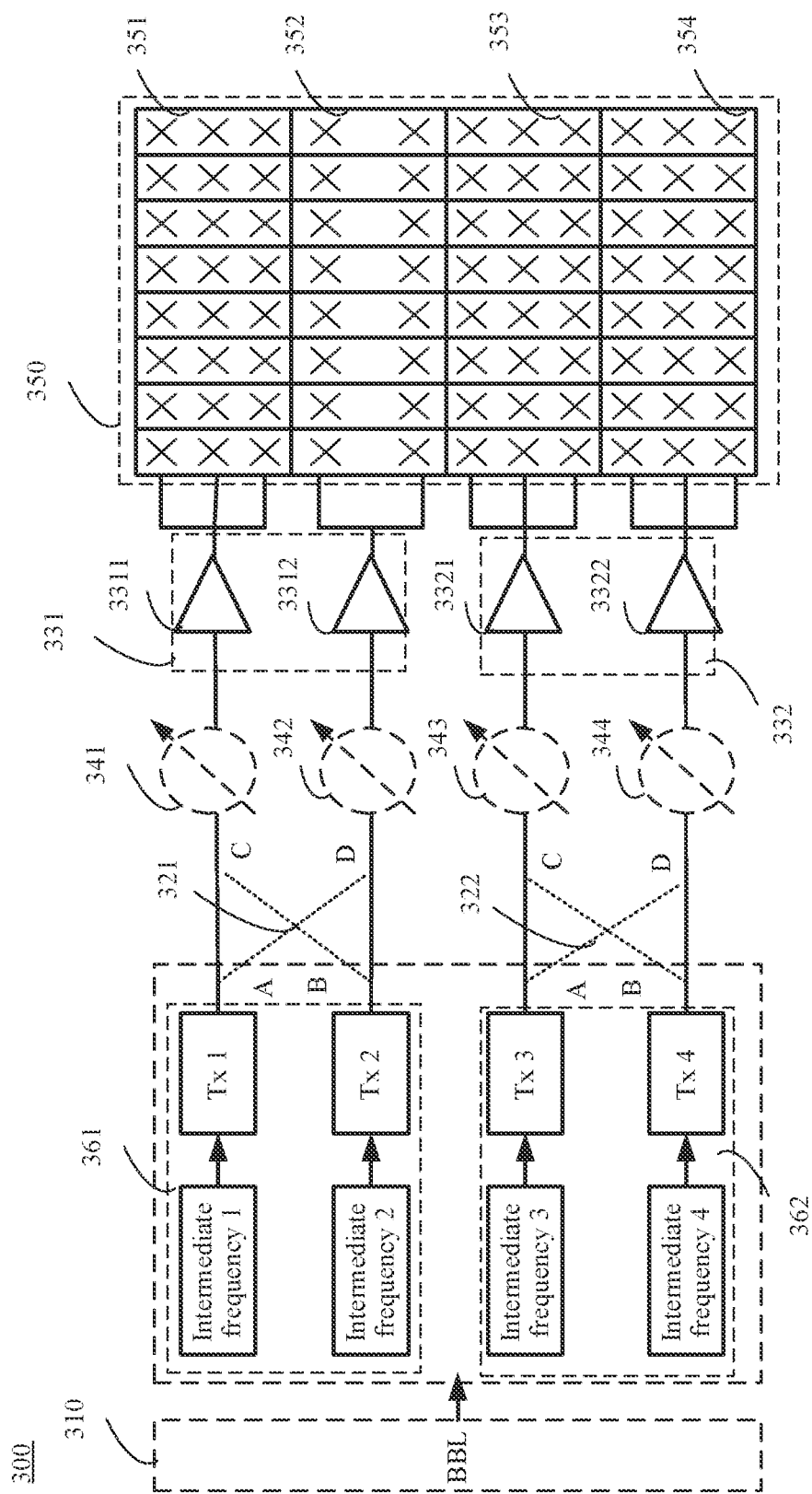
Figure 26:
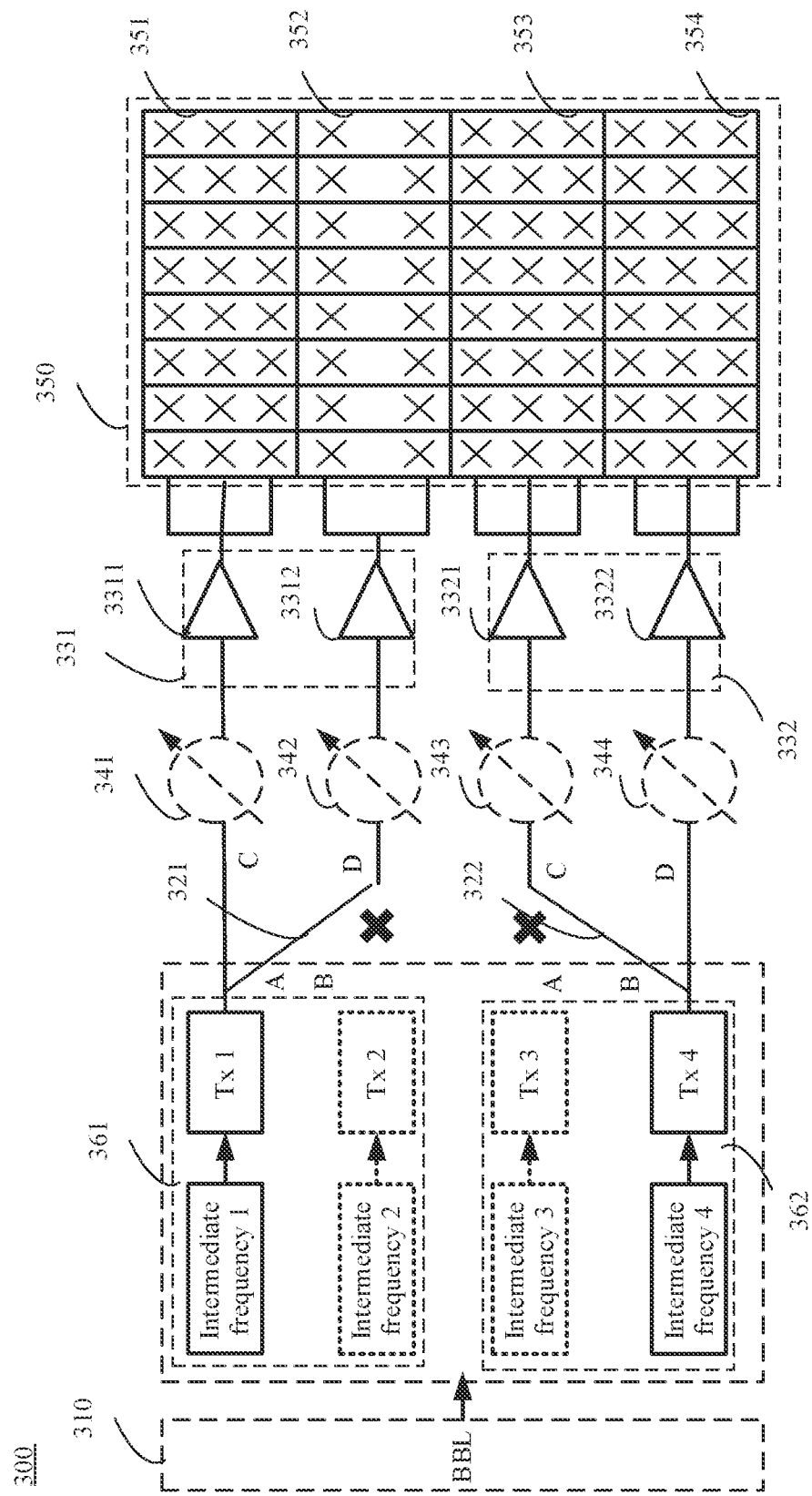

For example, in a downlink transmitting system 300 shown in FIG. 25 and FIG. 26, a Tx channel group 361 and a PA group 331 are connected through a bridge 321, and a Tx channel group 362 and a PA group 332 are connected through a bridge 322. The downlink transmitting system 300 shown in FIG. 11 and FIG. 12 further includes a phase shifter, and the phase shifter is located between a bridge and a PA. In this case, the Tx channel group 361 is connected to a phase shifter 341 and a phase shifter 342 21 through the bridge 321, and the Tx channel group 362 is connected to a phase shifter 343 and a phase shifter 344 through the bridge 322.

The downlink transmitting system 300 shown in FIG. 25 is in a first connection state. When determining that a first condition is met, a baseband processor may control the bridges to enable connection states of the bridge 321 and the bridge 322 to be the first connection state.

For example, in FIG. 25, the baseband processor controls the bridge 321, to enable a port A and a port C of the bridge 321 to be in a connected state, and enable a port B and a port D of the bridge 321 to be in a connected state, so as to enable two Tx channels in the Tx channel group 361 to be connected to two PAs in the PA group 331 in a one-to-one correspondence. To be specific, a $1^{st}$ Tx channel is connected to a PA 3311, and a $2^{nd}$ Tx channel is connected to a PA 3312. The baseband processor controls the bridge 322, to enable a port A and a port C of the bridge 322 to be in a connected state, and enable a port B and a port D of the bridge 322 to be in a connected state, so as to enable two Tx channels in the Tx channel group 362 to be connected to two PAs in the PA group 332 in a one-to-one correspondence. To be specific, a $3^{rd}$ Tx channel is connected to a PA 3321, and a $4^{th}$ Tx channel is connected to a PA 3322.

The downlink transmitting system 300 shown in FIG. 26 is in a second connection state. When determining that a second condition is met, the baseband processor may control the bridges to enable the connection states of the bridge 321 and the bridge 322 to be the second connection state.

For example, in FIG. 26, the baseband processor controls the bridge 321, to enable the port A, the port C, and the port D of the bridge 321 to be in a connected state, and enable the port B and the port D of the bridge 321 to be in a disconnected state, so as to enable the $1^{st}$ Tx channel to be connected to the PA 3311 and the PA 3312, and the $2^{nd}$ Tx channel to be in a disabled state. The baseband processor controls the bridge 322, to enable the port A and the port C of the bridge 322 to be in a disconnected state, and enable the port B, the port C, and the port D of the bridge 322 to be in a connected state, so as to enable the $4^{th}$ Tx channel to be connected to the PA 3321 and the PA 3322, and the $3^{rd}$ Tx channel to be in a disabled state.

In another implementation, the switching switch may include a single-pole double-throw switch, or include a single-pole double-throw switch and a single-pole single-throw switch.

Figure 27:
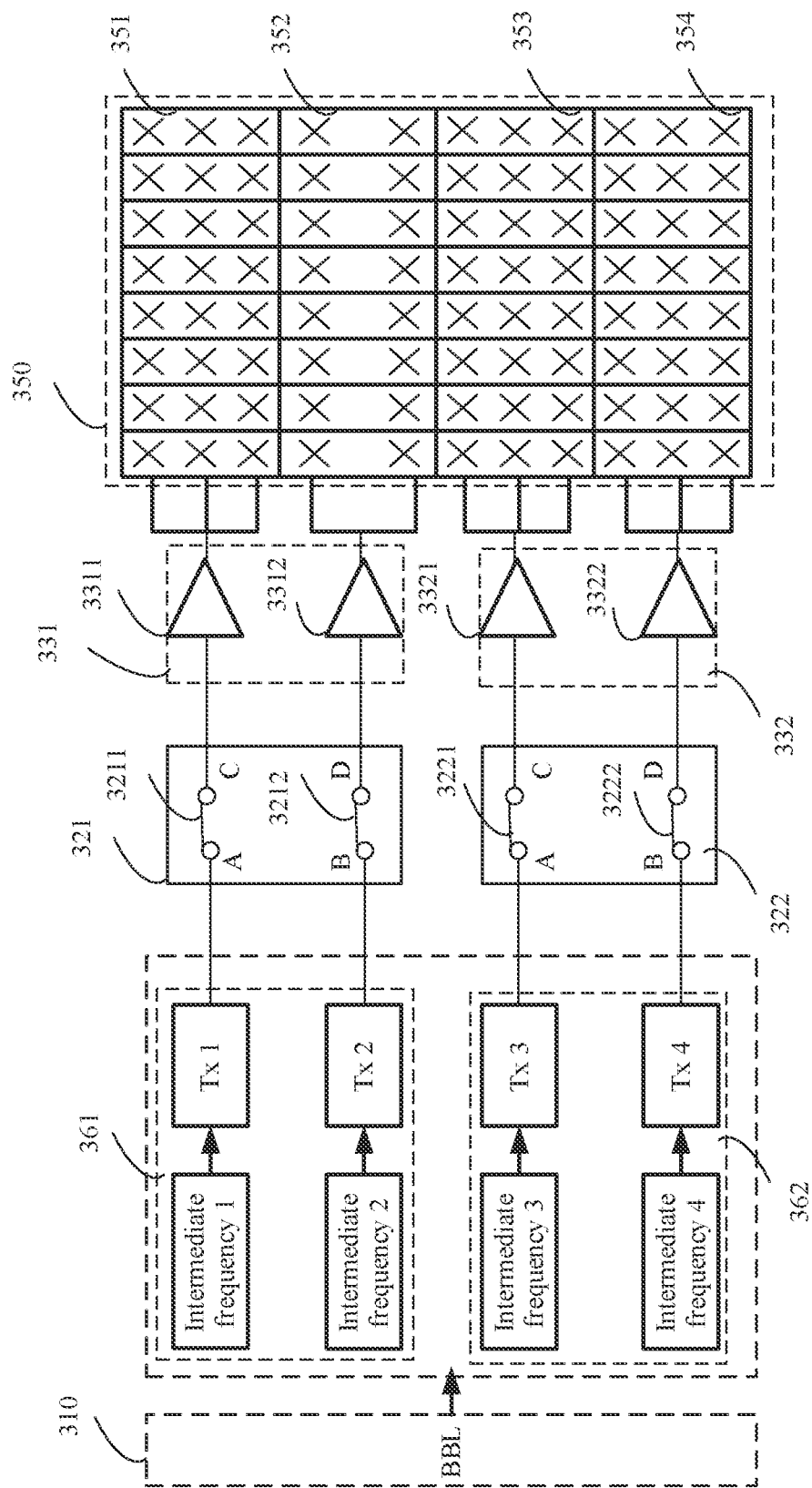
Figure 28:
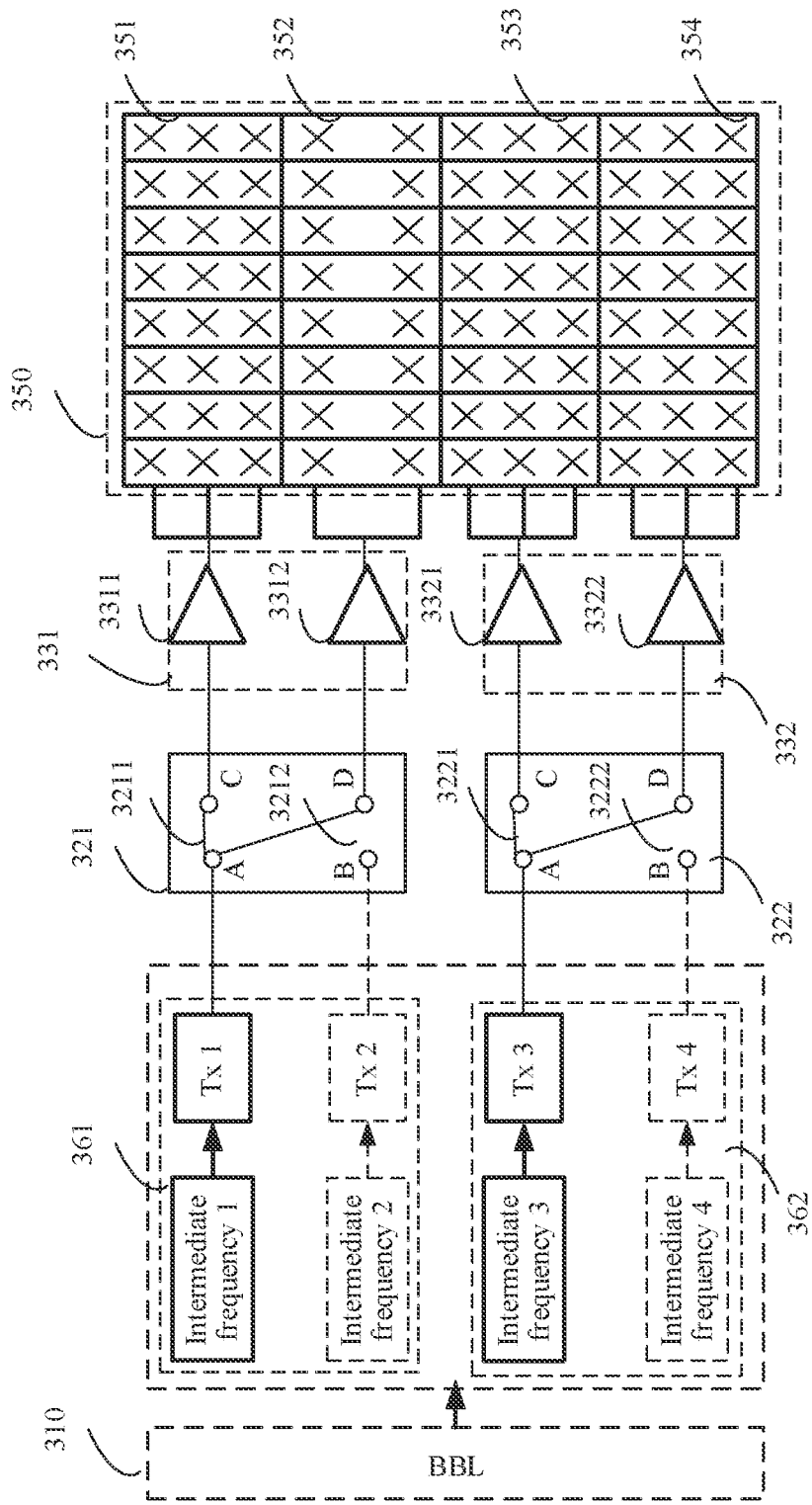

For example, in a downlink transmitting system 300 shown in FIG. 27 and FIG. 28, a Tx channel group 361 and a PA group 331 are connected through a switching switch 321, and the switching switch 321 may include a switch 3211 and a switch 3212. The switch 3211 and the switch 3212 may be single-pole double-throw switches. Alternatively, the switch 3211 is a single-pole single-throw switch, and the switch 3212 is a single-pole double-throw switch. Alternatively, the switch 3211 is a single-pole double-throw switch, and the switch 3212 is a single-pole single-throw switch. A Tx channel group 362 and a PA group 332 are connected through a switching switch 322, and the switching switch 322 may include a switch 3221 and a switch 3222. The switch 3221 and the switch 3222 may be single-pole double-throw switches. Alternatively, the switch 3221 is a single-pole single-throw switch, and the switch 3222 is a single-pole double-throw switch. Alternatively, the switch 3221 is a single-pole double-throw switch, and the switch 3222 is a single-pole single-throw switch.

The downlink transmitting system 300 shown in FIG. 27 is in a first connection state. When determining that a first condition is met, a baseband processor may control the switching switch to enable connection states of the switching switch 321 and the switching switch 322 to be the first connection state.

For example, in FIG. 27, the baseband processor controls the switching switch 321, to enable a port C of the switch 3211 to be connected to a port A of the switch 3211, and enable a port D of the switch 3212 to be connected to a port B of the switch 3212, so as to enable two Tx channels in the Tx channel group 361 to be connected to two PAs in the PA group 331 in a one-to-one correspondence. To be specific, a $1^{st}$ Tx channel is connected to a PA 331, and a $2^{nd}$ Tx channel is connected to a PA 332. The baseband processor controls the switching switch 322, to enable a port C of the switch 3221 to be connected to a port A of the switch 3221, and enable a port D of the switch 3221 to be connected to a port B of the switch 3222, so as to enable two Tx channels in the Tx channel group 362 to be connected to two PAs in the PA group 332 in a one-to-one correspondence. In other words, a $3^{rd}$ Tx channel is connected to a PA 333, and a $4^{th}$ Tx channel is connected to a PA 334.

The downlink transmitting system 300 shown in FIG. 28 is in a second connection state. When determining that a second condition is met, the baseband processor may control the switching switch to enable the connection states of the switching switch 321 and the switching switch 322 to be the second connection state.

For example, in FIG. 28, the baseband processor controls the switching switch 321, to enable the port C of the switch 3211 to be connected to the port A of the switch 3211, and enable the port D of the switch 3212 to be connected to the port A, so as to enable the $1^{st}$ Tx channel to be connected to the PA 3311 and the PA 3312, and the $2^{nd}$ Tx channel to be in a disabled state. The baseband processor controls the switching switch 322, to enable the port C of the switch 3221 to be connected to the port A of the switch 3221, and enable the port D of the switch 3222 to be connected to the port A, so as to enable the $3^{rd}$ Tx channel to be connected to the PA 3321 and the PA 3322, and the $4^{th}$ Tx channel to be in a disabled state.

It should be understood that the switches 3212 and 3222 in FIG. 28 are both single-pole double-throw switches, and the switch 3211 and the switch 3221 may be single-pole double-throw switches or may be single-pole single-throw switches.

It should be further understood that the single-pole single-throw switch mentioned in this embodiment of this application is a switch having a single-pole single-throw function, and the single-pole double-throw switch mentioned in this embodiment of this application is a switch having a single-pole double-throw function.

For structures and types of the switching switches in the downlink transmitting system 400 and the downlink transmitting system 500 provided in embodiments of this application, refer to descriptions in FIG. 25 to FIG. 28. For brevity, details are not described in this embodiment of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A downlink transmitting system, comprising:
   at least one digital intermediate frequency module group;
   at least one transmit (Tx) port group;
   a plurality of power amplifiers (PAs);
   at least one switching switch; and
   an antenna array, wherein:
   the plurality of PAs are connected to the antenna array,
   the plurality of PAs are connected to all Tx ports comprised in the downlink transmitting system in a one-to-one correspondence,
   the at least one digital intermediate frequency module group is in a one-to-one correspondence with the at least one Tx port group,
   each of the at least one Tx port group is connected to each digital intermediate frequency module in a corresponding digital intermediate frequency module group through one of the at least one switching switch,
   the each of the at least one Tx port group comprises a plurality of Tx ports,
   a quantity of digital intermediate frequency modules comprised in each digital intermediate frequency module group is equal to a quantity of Tx ports comprised in a corresponding Tx port group,
   each of the at least one switching switch has at least two connection states,
   quantities of enabled digital intermediate frequency modules in a digital intermediate frequency module group connected to the each of the at least one switching switch in different connection states are different, and
   all Tx ports in a Tx port group connected to the each of the at least one switching switch in the different connection states are in an enabled state.

2. The downlink transmitting system according to claim 1, wherein
   the at least two connection states comprise a first connection state and a second connection state, and a quantity of enabled digital intermediate frequency modules in the first connection state is greater than a quantity of enabled digital intermediate frequency modules in the second connection state, wherein
   in response to at least that a connection state of a first switching switch is the first connection state, a first plurality of Tx ports in a first Tx port group are connected to a plurality of digital intermediate frequency modules in a first digital intermediate frequency module group in a one-to-one correspondence, the first Tx port group and the first digital intermediate frequency module group are connected through the first switching switch, and the first switching switch is one of the at least one switching switch; and
   in response to at least that the connection state of the first switching switch is the second connection state, at least one first digital intermediate frequency module in the first digital intermediate frequency module group is connected to at least two Tx ports in the first Tx port group, and at least one second digital intermediate frequency module in the first digital intermediate frequency module group is not connected to all Tx ports in the first Tx port group.

3. The downlink transmitting system according to claim 2, wherein
a connection state of one of the at least one switching switch is the first connection state in response to at least that a first condition is met, and the first condition comprises at least one of the following conditions:
a quantity of users served by the downlink transmitting system is greater than or equal to a first threshold; and
a vertical spacing between at least two of the users served by the downlink transmitting system relative to a ground is greater than or equal to a second threshold.

4. The downlink transmitting system according to claim 2, wherein
a connection state of one of the at least one switching switch is the second connection state in response to at least that a second condition is met, and the second condition is as follows:
a quantity of users served by the downlink transmitting system is less than a first threshold, and a vertical spacing between any two of the users served by the downlink transmitting system relative to a ground is less than a second threshold.

5. The downlink transmitting system according to claim 1, wherein the downlink transmitting system further comprises a baseband processor, and the baseband processor is configured to control a connection state of the each of the at least one switching switch.

6. The downlink transmitting system according to claim 5, wherein the baseband processor is a baseband lower (BBL).

7. The downlink transmitting system according to claim 5, wherein the baseband processor is configured to control the connection state of the each of the at least one switching switch based on a quantity of users served by the downlink transmitting system and a vertical spacing between at least two of the users served by the downlink transmitting system relative to a ground.

8. The downlink transmitting system according to claim 7, wherein the quantity of the users served by the downlink transmitting system and the vertical spacing between the at least two of the users served by the downlink transmitting system relative to the ground are determined based on a received channel state information beam identifier.

9. The downlink transmitting system according to claim 1, wherein the each of the at least one switching switch is a bridge.

10. The downlink transmitting system according to claim 1, wherein the downlink transmitting system further comprises a plurality of phase shifters, and the plurality of phase shifters are connected to all the Tx ports comprised in the downlink transmitting system in a one-to-one correspondence.

11. The downlink transmitting system according to claim 1, wherein the each of the at least one switching switch includes a single-pole double-throw switch.

12. A method for switching, applied to a downlink transmitting system, wherein the downlink transmitting system comprises:
at least one digital intermediate frequency module group;
at least one transmit (Tx) port group;
a plurality of power amplifiers (PAS);
at least one switching switch; and
an antenna array, wherein:
the plurality of PAs are connected to the antenna array,
the plurality of PAs are connected to all Tx ports comprised in the downlink transmitting system in a one-to-one correspondence,
the at least one digital intermediate frequency module group is in a one-to-one correspondence with the at least one Tx port group,
each of the at least one Tx port group is connected to each digital intermediate frequency module in a corresponding digital intermediate frequency module group through one of the at least one switching switch,
the each of the at least one Tx port group comprises a plurality of Tx ports,
a quantity of digital intermediate frequency modules comprised in each digital intermediate frequency module group is equal to a quantity of Tx ports comprised in a corresponding Tx port group,
each of the at least one switching switch has at least two connection states,
quantities of enabled digital intermediate frequency modules in a digital intermediate frequency module group connected to the each of the at least one switching switch in different connection states are different,
all Tx ports in a Tx port group connected to the each of the at least one switching switch in the different connection states are in an enabled state, and
the method comprises:
controlling a connection state of the at least one switching switch based on a quantity of users served by the downlink transmitting system and a vertical spacing between at least two of the users served by the downlink transmitting system relative to a ground.

13. The method according to claim 12, wherein
the at least two connection states comprise a first connection state and a second connection state, and a quantity of enabled digital intermediate frequency modules in the first connection state is greater than a quantity of enabled digital intermediate frequency modules in the second connection state, wherein
in response to at least that a connection state of a first switching switch is the first connection state, a first plurality of Tx ports in a first Tx port group are connected to a plurality of digital intermediate frequency modules in a first digital intermediate frequency module group in a one-to-one correspondence, the first Tx port group and the first digital intermediate frequency module group are connected through the first switching switch, and the first switching switch is one of the at least one switching switch; and
in response to at least that the connection state of the first switching switch is the second connection state, at least one first digital intermediate frequency module in the first digital intermediate frequency module group is connected to at least two Tx ports in the first Tx port group, and at least one second digital intermediate frequency module in the first digital intermediate frequency module group is not connected to all Tx ports in the first Tx port group.

14. The method according to claim 13, wherein the controlling the connection state of the at least one switching switch based on the quantity of the users served by the downlink transmitting system and the vertical spacing between the at least two of the users served by the downlink transmitting system relative to the ground comprises:
in response to at least that a first condition is met, controlling the connection state of the at least one switching switch to be the first connection state, wherein the first condition comprises at least one of the following conditions:

the quantity of the users served by the downlink transmitting system is greater than or equal to a first threshold; and the vertical spacing between the at least two of the users served by the downlink transmitting system relative to the ground is greater than or equal to a second threshold.

15. The method according to claim 13, wherein the controlling the connection state of the at least one switching switch based on the quantity of the users served by the downlink transmitting system and the vertical spacing between the at least two of the users served by the downlink transmitting system relative to the ground comprises:

in response to at least that a second condition is met, controlling the connection state of the at least one switching switch to be the second connection state, wherein the second condition is as follows:

the quantity of the users served by the downlink transmitting system is less than a first threshold, and the vertical spacing between any two of the users served by the downlink transmitting system relative to the ground is less than a second threshold.

16. The method according to claim 12, wherein the method further comprises:

determining the quantity of the users served by the downlink transmitting system and the vertical spacing between the at least two of the users served by the downlink transmitting system relative to the ground based on a received channel state information beam identifier.

17. The method according to claim 12, wherein the downlink transmitting system includes a baseband processor, and the baseband processor is configured to control the connection state of the at least one switching switch based on the quantity of the users served by the downlink transmitting system and the vertical spacing between the at least two of the users served by the downlink transmitting system.

18. The method according to claim 12, wherein the each of the at least one switching switch is a bridge.

19. The method according to claim 12, wherein the each of the at least one switching switch includes a single-pole double-throw switch.

20. The method according to claim 12, wherein the downlink transmitting system further comprises a plurality of phase shifters, and the plurality of phase shifters are connected to all the Tx ports comprised in the downlink transmitting system in a one-to-one correspondence.

* * * * *